(12) United States Patent
Das et al.

(10) Patent No.: US 11,290,984 B2
(45) Date of Patent: Mar. 29, 2022

(54) C-V2X MESSAGE PROCESSING TIMELINE ADAPTION BASED ON CONTOURING OF REMOTE VEHICLES AND AVAILABLE DELAY BUDGET

(71) Applicant: QUALCOMM Incorporated, San Diego, CA (US)

(72) Inventors: Soumya Das, San Diego, CA (US); Hee Jun Park, San Diego, CA (US); Sean Vincent Maschue, Encinitas, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 16/797,674

(22) Filed: Feb. 21, 2020

(65) Prior Publication Data
US 2021/0266867 A1    Aug. 26, 2021

(51) Int. Cl.
*H04W 72/02* (2009.01)
*H04W 4/40* (2018.01)
*H04W 4/12* (2009.01)
*H04W 72/10* (2009.01)
*H04W 92/18* (2009.01)

(52) U.S. Cl.
CPC ............. *H04W 72/02* (2013.01); *H04W 4/12* (2013.01); *H04W 4/40* (2018.02); *H04W 72/10* (2013.01); *H04W 92/18* (2013.01)

(58) Field of Classification Search
CPC ....... H04W 72/02; H04W 72/10; H04W 4/12; H04W 4/40

USPC .................................................. 370/328–329
See application file for complete search history.

(56) References Cited

U.S. PATENT DOCUMENTS

| | | | |
|---|---|---|---|
| 9,936,361 B1 | 4/2018 | Weinfield | |
| 10,157,539 B1 * | 12/2018 | Hoover | G08G 1/0112 |
| 10,410,436 B2 * | 9/2019 | Noh | H04W 12/71 |
| 2013/0083679 A1 | 4/2013 | Krishnaswamy et al. | |
| 2016/0203711 A1 | 7/2016 | Scherping et al. | |
| 2019/0043357 A1 * | 2/2019 | Stinnett | B60W 50/0098 |
| 2020/0001870 A1 * | 1/2020 | Saigusa | B60W 30/16 |

OTHER PUBLICATIONS

International Search Report and Written Opinion—PCT/US2021/018473—ISA/EPO—dated Jun. 7, 2021.

* cited by examiner

*Primary Examiner* — Congvan Tran
(74) *Attorney, Agent, or Firm* — Weaver Austin Villeneuve & Sampson LLP

(57) ABSTRACT

Techniques described herein provide for filtering and prioritizing incoming messages, which can help reduce and smooth out the processing load on components used to process the incoming messages. Filtering techniques may comprise identifying a subset of nearby vehicles from which messages are to be processed, and further calculating remaining delay budgets with regard to the messages to prioritize them for processing. Different techniques for determining a subset of nearby vehicles can be used, and/or remaining delay budgets may be calculated and/or communicated in different ways.

30 Claims, 12 Drawing Sheets

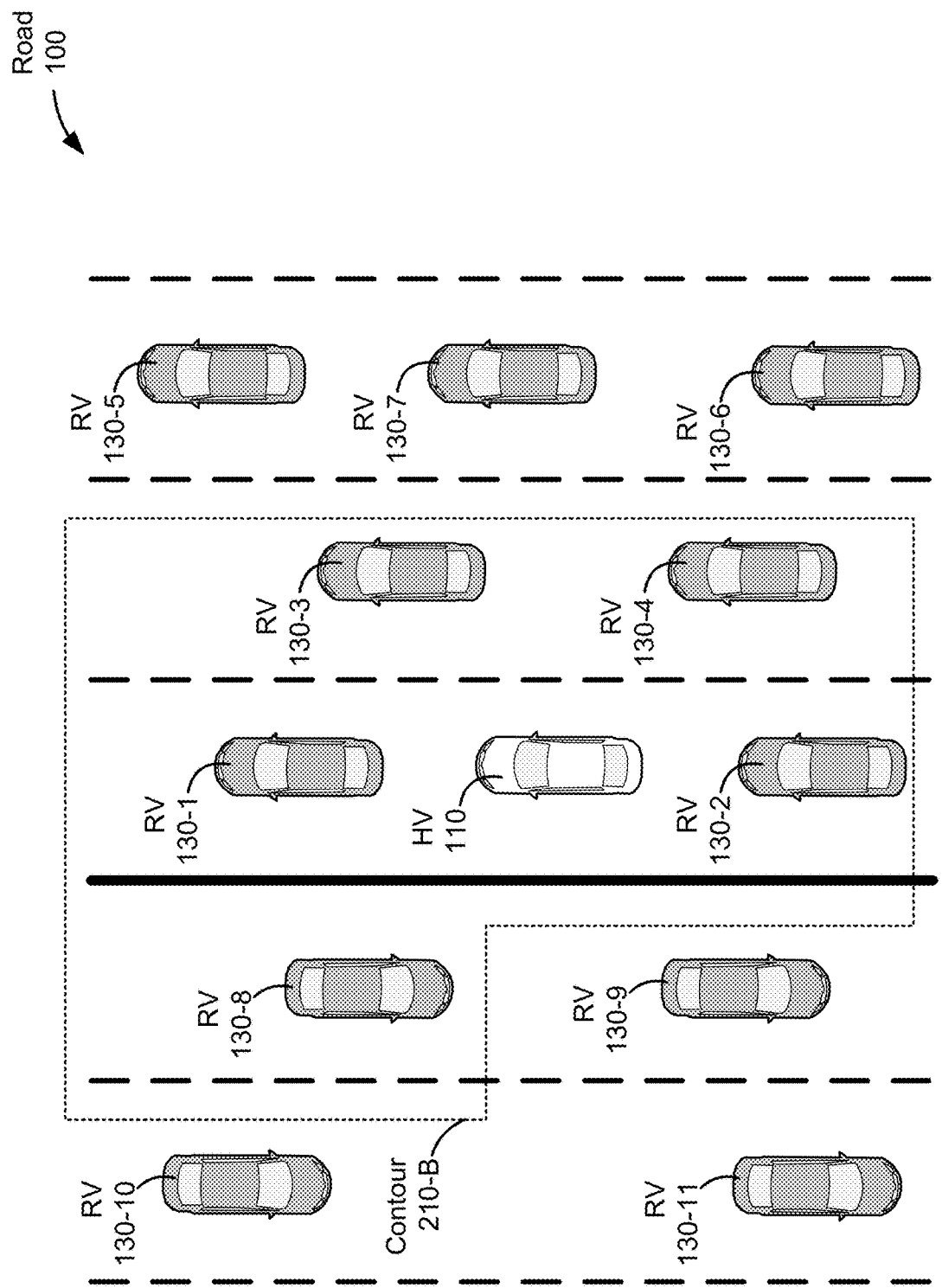

C-V2X MESSAGE PROCESSING TIMELINE ADAPTION BASED ON CONTOURING OF REMOTE VEHICLES AND AVAILABLE DELAY BUDGET

BACKGROUND

Autonomous or partially autonomous cars can regularly communicate with nearby vehicles to enhance the safety, efficiency and convenience of vehicular transportation. For example, path and maneuver planning for a vehicle to everything (V2X)-capable vehicle (such as a cellular vehicle to everything-capable vehicle (CV2X)) depends on knowing the accurate inter-vehicle distances and relative locations. The capabilities and behavior of surrounding vehicles helps determine, for example, safe inter-vehicle spacing and lane change maneuvering. The location and location-related measurements are regularly communicated between vehicles, for example, through V2X application-layer standards using messages such as the Basic Safety Message (BSM). However, these messages can be broadcast from vehicles at a rate of several times per second, and thus a V2X-capable vehicle that is surrounded by a large number of V2X-capable vehicles may receive an extremely large amount of messages to process. Furthermore, some messages may have a higher priority and may need to be attended to more quickly than others, and various operating constraints may further change the V2X-capable vehicle's capacity for processing incoming messages.

BRIEF SUMMARY

Techniques described herein provide for filtering and prioritizing incoming messages, which can help reduce and smooth out the processing load on components used to process the incoming messages. Filtering techniques may comprise identifying a subset of nearby vehicles from which messages are to be processed, and further calculating remaining delay budgets with regard to the messages to prioritize them for processing. Different techniques for categorizing nearby vehicles and determining a subset of nearby vehicles can be used, and different techniques for calculating and/or communicating delay budgets can be used.

An example method of message selection and prioritization at a host vehicle (HV), according to this description, comprises wirelessly receiving messages from a plurality of remote vehicles (RVs), determining a first subset of the plurality of RVs from which to process the messages, wherein the first subset is determined based at least in part on: the respective location of each RV relative to the HV, one or more road conditions, and one or more operating constraints of the HV. The method further comprises, for each message received from an RV in the first subset, determining a priority for the respective message based at least in part on an indication of a remaining delay budget for the respective message, wherein the priority for the respective message determines an order in which content of the respective message is to be processed by the HV, and the indication of the remaining delay budget for the respective message is received with the respective message.

An example device for message selection and prioritization at a host vehicle (HV), according to this description, comprises one or more wireless transceivers, a memory, and one or more processors communicatively coupled to the one or more wireless transceivers and the memory. The one or more processors are configured to receive, via the one or more wireless transceivers, messages from a plurality of remote vehicles (RVs), and determine a first subset of the plurality of RVs from which to process the messages, wherein the first subset is determined based at least in part on: the respective location of each RV relative to the HV, one or more road conditions, and one or more operating constraints of the HV. The one or more processors are further configured to, for each message received from an RV in the first subset, determine a priority for the respective message based at least in part on an indication of a remaining delay budget for the respective message, wherein the priority for the respective message determines an order in which content of the respective message is to be processed by the HV, and the indication of the remaining delay budget for the respective message is received with the respective message.

An example device, according to this description, comprises means for wirelessly receiving messages from a plurality of remote vehicles (RVs), and means for determining a first subset of the plurality of RVs from which to process the messages, wherein the first subset is determined based at least in part on the respective location of each RV relative to a host vehicle (HV), one or more road conditions, and one or more operating constraints of the HV. The device further comprises means for determining, for each message received from an RV in the first subset, a priority for the respective message based at least in part on an indication of a remaining delay budget for the respective message, wherein the priority for the respective message determines an order in which content of the respective message is to be processed by the HV, and the indication of the remaining delay budget for the respective message is received with the respective message.

An example non-transitory computer-readable medium, according to this description, comprises instructions stored thereon for message selection and prioritization at a host vehicle (HV). The instructions, when executed by one or more processors, cause the one or more processors to wirelessly receive messages from a plurality of remote vehicles (RVs), and determine a first subset of the plurality of RVs from which to process the messages, wherein the first subset is determined based at least in part on the respective location of each RV relative to the HV, one or more road conditions, and one or more operating constraints of the HV. The instructions, when executed by one or more processors, further cause the one or more processors to determine, for each message received from an RV in the first subset, a priority for the respective message based at least in part on an indication of a remaining delay budget for the respective message, wherein: the priority for the respective message determines an order in which content of the respective message is to be processed by the HV, and the indication of the remaining delay budget for the respective message is received with the respective message.

BRIEF DESCRIPTION OF THE DRAWINGS

FIGS. 2A, 2B, and 3 are illustrations of the overhead view of FIG. 1, with different contours applied, according to an embodiment.

Figure 1:
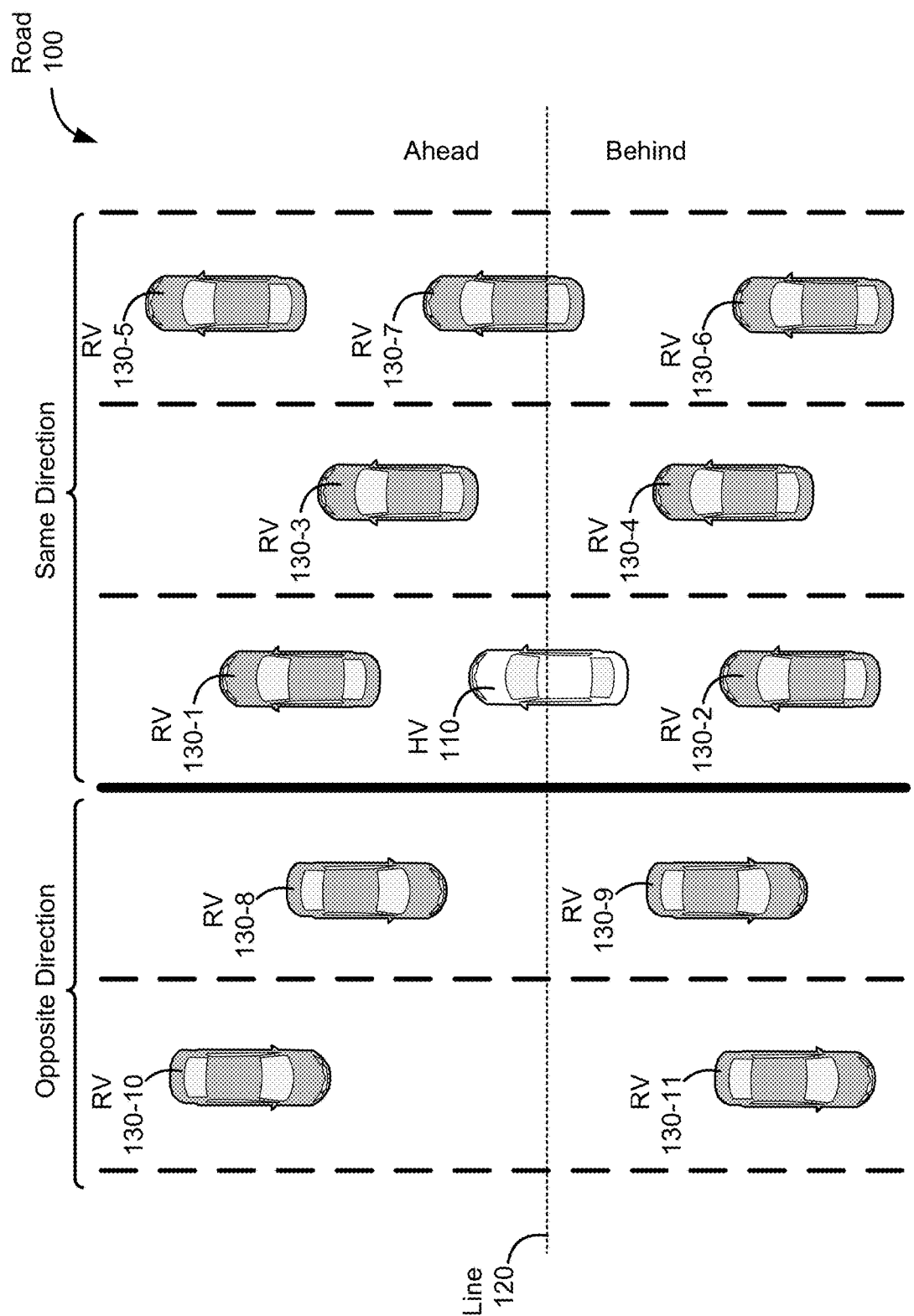
FIG. 1 is an overhead view of a road, provided to help illustrate how vehicles may be categorized and zones of interest can be established, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

V2X-capable vehicles may execute vehicle-to-vehicle (V2V) safety applications built around Society of Automotive Engineers (SAE) J2735 BSMs, which communicate information about vehicle position, time, heading, speed, acceleration, predicted path, path history, and more. As noted, this information can be used by nearby vehicles to inform the vehicles' movement and maneuver execution. As noted, a given V2X-capable vehicle of interest, referred to herein as a Host Vehicle (HV), may receive a large number of BSMs broadcast by nearby V2X-capable vehicles within communication range, referred to herein as Remote Vehicles (RVs). For example, BSMs may be broadcast up to 10 times per second (10 Hz). And thus, if an HV is surrounded by 200 RVs each communicating up to 10 BSMs per second, the HV may need to process up to 2000 BSMs per second. This processing can include verifying digitally-signed certificates of the messages and determining, based on the content of the messages, whether to issue a warning to a driver, alter or execute a maneuver, etc. Moreover, additional message types (e.g., non-BSM safety messages) may also be communicated to the HV from nearby RVs, and other communications may be received from Road-Side Units (RSUs), traffic-related servers, and more. Further, the information communicated by BSMs and other messages is often very time sensitive and must be processed quickly by the HV before it becomes irrelevant. Thus, the HV often has a limited ability to delay the processing of these incoming messages. This can cause a high processing load on the hardware block (e.g., Central Processing Unit (CPU), Digital Signal Processor (DSP), and/or Elliptic Curve Digital Signature Algorithm (ECDSA)) of the HV.

Traditional techniques for handling these issues have their shortcomings. For example, to avoid any compromise of safety, current schemes are designed to run at a performance level for the worst case (e.g., a maximum number of messages). To provide the processing capacity sufficient to do so, this can be a costly option in terms of price, power, and/or temperature. Additionally, traditional techniques often only account for packet delay budgets allocated at radio layers of the transmitting RV and the receiving HV, without accounting for total end-to-end packet delay from the application layer of the transmitting RV to the application layer of the receiving HV. This can mean that, although radio-layer delay budgets are met, messages may not be processed in time to meet application-layer needs. To overcome this, traditional techniques again use brute force techniques by operating radio-layer hardware (modems) at a very high operating frequency to account for worst-case scenarios at all times, without accounting for changes for messages from RVs.

Embodiments provided herein can address these and other issues by enabling an HV to filter incoming messages from RVs by establishing a zone of interest to identify RVs from which messages will be processed, and further prioritize the filtered messages at an application layer based on remaining time budget to smooth the processing load requirements out over time. The zone of interest can be defined based on a number of factors, including the relative locations of the RVs, one or more road conditions, and one or more vehicle operating conditions. Additional details are provided herein below, with respect to the appended figures.

FIG. 1 is an overhead view of a road 100, provided to help illustrate how RVs may be categorized and zones of interest can be established. FIG. 1 shows multiple vehicles on the road 100, including an HV 110 surrounded by multiple RVs (collectively and generically referred to herein as RVs 130). As can be seen, the trajectory of the RVs 130 can be categorized as going in the same direction or opposite (reverse) direction as the HV. Additionally, according to some embodiments, the location of the RVs 130 may be categorized as being "ahead" or "behind" of the HV 110, based on the orientation of the HV 110, as illustrated by the line 120 shown in FIG. 1. (It will be understood, however, that alternative embodiments may position the line 120 differently with respect to the HV 110, such as more toward the front of the HV 110 or more toward the back of the HV 110. Additionally or alternatively, embodiments may categorize vehicles as being either ahead or behind, but "adjacent" to the HV 110, as indicated below.)

For purposes of the description herein, a notation can be used to describe the location and trajectory of RVs 130 with respect to the HV 110. A mapping of the RVs illustrated in FIG. 1 to the notation used herein and a description of the notation is provided in Table 1.

TABLE 1

RV notation as applied to FIG. 1.

| RV | Notation | Description |
|---|---|---|
| 130-1 | Nsa | sa = "same, ahead"; in same lane as HV, ahead of HV |

TABLE 1-continued

RV notation as applied to FIG. 1.

| RV | Notation | Description |
| --- | --- | --- |
| 130-2 | Nsb | sb = "same, behind";<br>in same lane as HV, behind HV |
| 130-3 | Naa | aa = "adjacent, ahead";<br>in lane adjacent to HV, ahead of HV |
| 130-4 | Nab | ab = "adjacent, behind";<br>same lane as HV, behind HV |
| 130-5 | Nna | na = "non-adjacent, ahead";<br>in lane non-adjacent to HV, ahead of HV |
| 130-6 | Nnb | nb = "non-adjacent, behind";<br>in lane non-adjacent to HV, behind HV |
| 130-7 | Nna | na = "non-adjacent, ahead";<br>in lane non-adjacent to HV, ahead of HV |
| 130-8 | Nraa | raa = "reverse, adjacent, ahead";<br>reverse direction of HV, in lane adjacent to HV, ahead of HV |
| 130-9 | Nrab | rab = "reverse, adjacent, behind";<br>reverse direction of HV, in lane adjacent to HV, behind HV |
| 130-10 | Nrna | rna = "reverse, non-adjacent, ahead";<br>reverse direction of HV, in lane non-adjacent to HV, ahead of HV |
| 130-11 | Nrnb | rnb = "reverse, non-adjacent, behind";<br>reverse direction of HV, in lane non-adjacent to HV, behind HV |

As can be seen in Table 1, the notation accounts for the direction and location of RVs 130 surrounding HV 110. As previously noted, additional notation may be used to account for RVs 130 that are neither fully ahead of or fully behind the HV 110. For example, line 120 passes through RV 130-7, in which case it may be considered "adjacent." RVs (not shown) in other lands that are also neither fully ahead of or behind the HV 110 may be similarly categorized. That said, based on information received by the HV 110 (e.g., via a BSM received from RV 130-7) regarding the location of RV 130-7, the HV 110 may determine to categorize RV 130-7 as being either ahead of or behind HV 110, based on a certain location on RV 130-7 (e.g., the front, center, or back of the vehicle).

In the early example of the HV 110 being surrounded by 200 cars, it is likely that BSMs or similar messages from many other cars are irrelevant to the safety or operation of the HV 110. With this in mind, and referring again to the example shown in FIG. 1, the HV 110 can create one or more "contours" that define one or more areas of interest around groups of RVs 130. These contours can specifically exclude RVs 130 from which messages may not be relevant. For example, messages from RVs 130-9 and 130-11, which are traveling in the opposite direction and are behind the HV 110 may be excluded from these areas of interest. Many other factors may be taken into account when determining contours defining an area of interest.

Figure 2A:
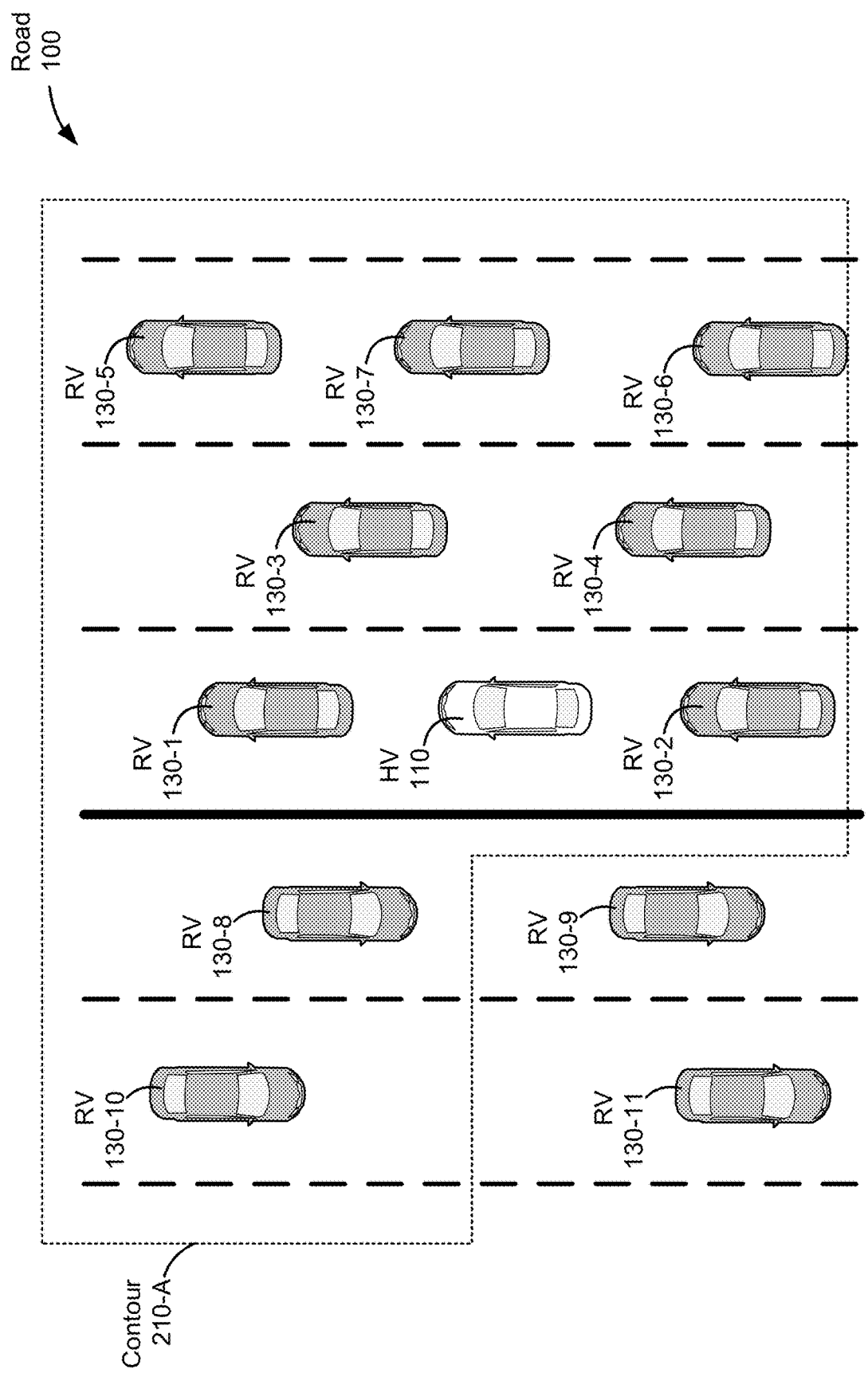

FIGS. 2A and 2B are overhead views of the road 100 of FIG. 1 with two different contours, 210-A and 210-B, respectively (collectively and generically referred to herein as contours 210). As illustrated, the contours 210 define an area in which a subset of the neighboring RVs are located. The examples provided in FIGS. 2A and 2B show relatively simple contours, but it will be understood that contours may be more complex in real life scenarios. For example, contours may be three-dimensional to take into account underpasses or overpasses near the HV 110. Further, contours 210 may be determined by an application layer of the HV 110, which may be executed by one or more processors (as described in more detail below).

The shape of a contour 210 may be based on any variety of factors related to current traffic conditions for the HV 110. These factors, termed "road conditions" herein, may comprise, for example the speed and/or heading of the HV 110, the number of lanes of the road 100, the current lane in which the HV 110 is located, road hazards, weather-related conditions (rain, snow, ice, etc.), speed limits, path history and/or predicted path of RVs 130, and so forth. This information may be gathered via sensors on the HV 110, V2X and/or other communications with RVs 130, communication with computer servers (providing, for example, map-related, weather-related, and/or other traffic-related information), and so forth. (Additional detail regarding is described below with regard to FIG. 8.)

Additionally, the shape of the contour 210 may be based on one or more constraints due to the processing capabilities of the HV 110. These constraints, termed "operating constraints" herein, may comprise, for example, constraints in the message-processing capabilities of the HV 110, which may be due to static and/or dynamic features of the underlying hardware and/or software used by the HV 110 to process messages. (Examples of hardware and software components used to process messages are provided herein below, with regard to FIG. 10.)

Another operating constraint may comprise a thermal constraint, which can also limit the amount of messages processed. That is, given the on-chip temperature of a processor and/or other digital processing hardware used to process the messages, and/or the temperature outside the HV 110, the processing of messages may be reduced (e.g., via a reduction in the operating clock frequency) to help ensure a thermal maximum is not exceeded, in efforts to ensure the operating integrity of the processing hardware.

Another operating constraint may comprise a concurrency constraint, related to the ability of the HV 110 to engage in concurrent operations utilizing the same underlying hardware and/or software components used to process messages. That is, the communication components used to send and receive V2X messages may comprise components enabling cellular communication such as communication via Long-Term Evolution (LTE) or fifth-generation (5G). Accordingly, these components may also be used for data, voice, emergency (e.g., eCall), and/or other communication. Because components of the HV 110 may be engaged in such alternative forms of communication (or may reserve a certain amount of capabilities to be able to engage in such alternative forms of communication), this may operate as a constraint, limiting the amount of messages the HV 110 is able to process over a certain period of time.

Returning to the notation shown in Table 1, a contour 210 may be defined by the number of RVs 130 of different RV types are included within an area of interest. For example, each of the various parameters (Nsa, Nsb, Naa, etc.) corresponding to a different type of RV 130 may be "tuned" to include a larger or smaller amount of RVs 130 of that type, depending on the various road conditions and/or operating constraints. This "tuning" can be distance-based, such that an increase in a particular parameter may result in the contour 210 expanding to include additional RVs 130 of the same type, but farther away from the HV 110. In the example of FIG. 2A, for instance, the value of the term Nsa is 1. That is, there is only one RVs 130-1 in the same lane, going in the same direction, and located ahead of the HV 110. An increase in the value of the term Nsa can result in the contour 210-A encompassing additional HVs (not shown) in the same lane, going the same direction, and located ahead of the HV 110. As the value of the term Nsa increases, so, too, does the distance of the contour 210-A increase in front of the HV 110 to encompass the additional HVs.

This tuning of parameters is shown in the differences of contours 210 in FIGS. 2A and 2B. In FIG. 2B, the corresponding contour 210-B encompasses a smaller area of interest than the contour 210-A of FIG. A. Again, this could be due to one or more of the various road conditions and/or operating constraints. The contour 210-A of FIG. 2A defining the larger area of interest may be due to the HV 110 having relatively fewer operating constraints (fewer limits on message-processing capabilities). Additionally or alternatively, the relatively larger area of interest may be due to road conditions warranting a larger area of interest, such as hazardous weather conditions (e.g., icy roads), the HV 110 traveling at relatively high speeds, a large number of RVs 130 within a relatively short distance from the HV 110, a curve in the road 100, or the like. On the other hand, the contour 210-B of FIG. 2B defining a smaller area of interest may be due to the HV 110 having relatively more operating constraints (more limits on message-processing capabilities) and/or having road conditions warranting a smaller area of interest, such as dry roads, low speeds, etc.

Some embodiments may account for operating constraints and road conditions in a different manner. For example, in some embodiments, the HV 110 may use a two-step approach by first determining (e.g., at an application layer) multiple contours 210 based on various road conditions, then selecting from the contours based on operating constraints. This process is illustrated in FIG. 3.

Figure 3:
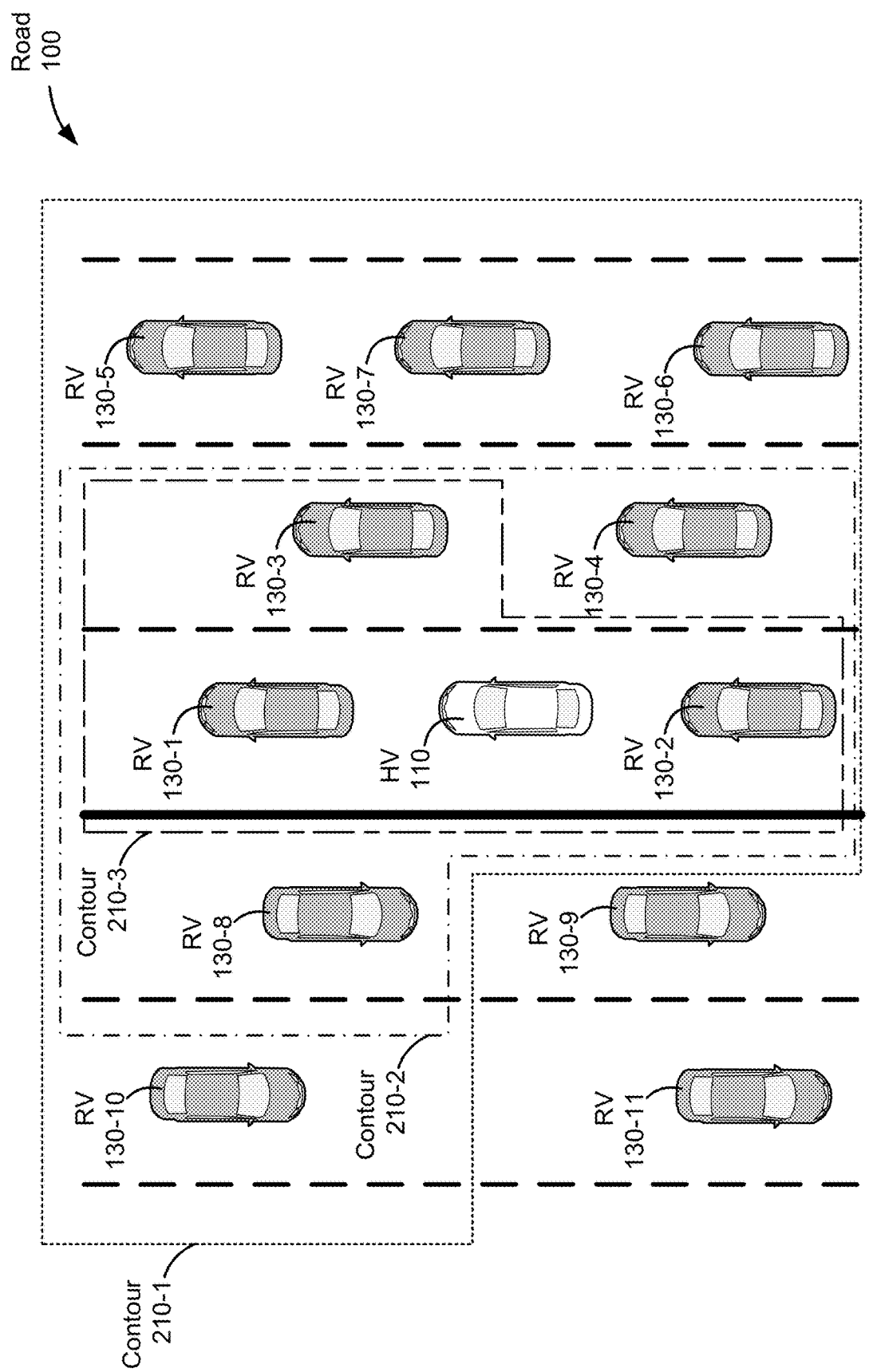

FIG. 3 is an overhead view of the road 100 of FIG. 1 with multiple contours 210-1, 210-2, and 210-3, as determined by the HV 110. Contours may be ordered such that the largest contour 210-1 corresponds to a "first-order" contour, the second-largest contour 210-2 corresponds to a "second-order" contour, and the third-largest contour 210-3 corresponds to a "third-order" contour. As will be appreciated, an HV 110 may compute any number of contours 210.

Again, using the notation of Table 1, a contour of order "i" may define the value of each parameter type as $Nsa_i$, $Naa_i$, $Nna_i$, etc. Higher-order contours have smaller areas of interest and encompass fewer RVs 130 than lower order contours. Thus, where first order parameters are defined as $Nsa_1$, $Naa_1$, $Nna_1$, etc., and second order parameters are defined as $Nsa_2$, $Naa_2$, $Nna_2$, etc., each of the second order parameters is equal to or less than the corresponding parameter in the first-order, such that $Nsa_2 \leq Nsa_1$, $Naa_2 \leq Naa_1$, $Nna_2 \leq Nna_1$, etc., where at least one parameter in the second order is less than the corresponding parameter in the first order.

The contours 210 of FIG. 3 may be created based on the previously-noted road conditions, as well as some logic for reducing the area of interest for higher-order contours. For example, an initial contour 210-1 may be created based on road conditions, under the assumption that operating constraints are minimal. Logic may then be applied to reduce the value of some or all of the parameters (e.g., to reduce the amount of encompassed RVs 130 by one or more) to create the second-order contour 210-2. This logic may then be applied again to reduce the value of some or all of the parameters of the second-order contour 210-2, to create the third-order contour 210-3, and so on.

Once the contours 210 are created, the HV 110 may then select the contour 210 to use, based on operating constraints. If, for example, operating constraints are relatively minimal, then a relatively low-order contour may be chosen. On the other hand, if operating constraints are restrictive, then a relatively high-order contour may be chosen.

Figure 4:
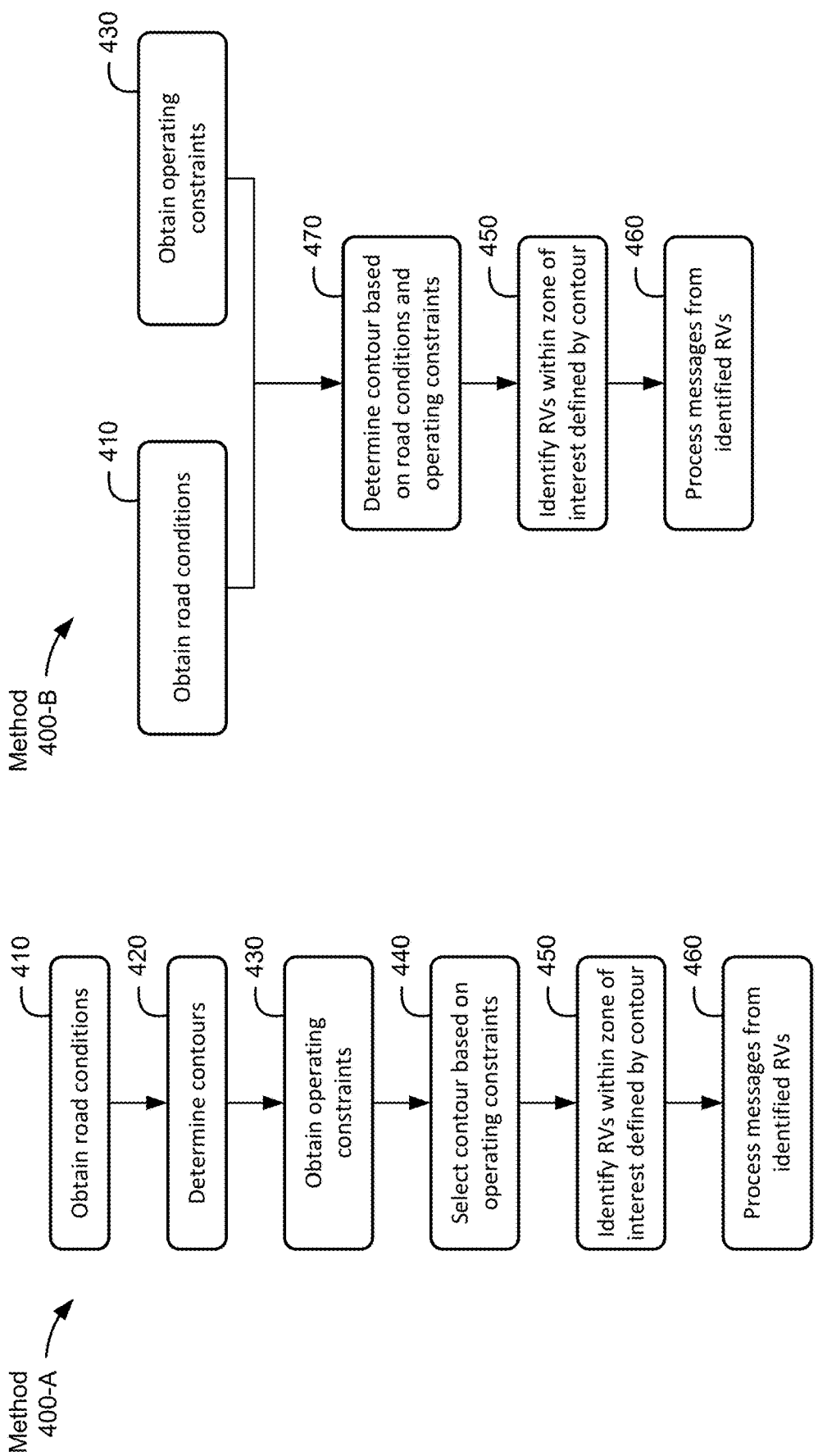
FIGS. 4A and 4B are flowcharts that illustrate methods for creating an area of interest to use in filtering messages from incoming vehicles, according to some embodiments.

FIGS. 4A and 4B are flowcharts that illustrate methods 400 for creating an area of interest to use in filtering messages from incoming RVs 130, outlining the different embodiments previously described in relation to FIGS. 2A-3. The HV 110 may repeat either or both of the methods 400 to continuously define contours 210 with which message filtering may be conducted. Means for performing these methods may include one or more hardware and/or software components of an HV 110, such as those illustrated in FIG. 10, which is described below.

Method 400-A of FIG. 4A, for example, shows the two-step approach previously described with regard to FIG. 3, in which contours are defined based on road conditions (and other logic), and a contour is then selected based on operating constraints. Specifically, the functionality at block 410 comprises obtaining road conditions. Again, this may be obtained from sensors, RVs 130, servers, and/or other devices with which the HV 110 is communicatively connected.

As shown at block 420, the contours 210 are then determined, based on the obtained road conditions and additional logic. Higher-order contours 210 may be defined by reducing the number of one or more types of RVs 130 (e.g., parameters of Table 1) at each increasing order. Depending on desired functionality, the HV 110 may determine any number of contours 210, which may be fixed or dynamic, depending on desired functionality.

As shown at block 430, operating constraints are then obtained. As noted, this may comprise comparing an on-chip temperature and/or ambient temperature with a temperature threshold of the HV 110, assessing message processing capabilities of the HV 110, and/or determining whether processing resources are being shared with other processes (e.g., cellular data/voice communication). A contour 210 is then selected based on the operating constraints, as shown at block 440.

The functionality shown at block 450 comprises identifying RVs 130 within the zone of interest defined by the contour 210. Again, this may be based on location, identity, and/or other information obtained directly from RVs 130, and/or information from other sources. The method 400-A can then proceed by processing the messages from the identified RVs, while disregarding messages from other RVs. As noted, filtering messages in this manner can result in a significant reduction in processing load by ignoring messages (e.g., BSMs) that are not relevant to the HV 110.

In some embodiments, the disregarding of messages from RVs 130 outside the area of interest may be conducted by a combination of functionality at the application layer and radio layer of the HV 110 (which are described in more detail below). In some embodiments, for example, the application layer may perform the functionality at block 450 by identifying RVs 130 within the zone of interest, then indicate to the radio layer the identity of the identified RVs so that the radio layer can filter incoming messages accordingly. In some embodiments, for example, the application layer can provide the radio layer with the L2 addresses of messages that are to be considered (although this may be limited given the fact that these addresses can change over time).

The method 400-B shows the single-step approach previously discussed with regard to FIGS. 2A and 2B, in which the functions shown in block 410 and 430 of FIG. 4A (obtaining road conditions and operating constraints, respectively) are performed together, and, as shown at block 470, a single contour is determined based on both road conditions and operating constraints. The method 400-B can then proceed in a manner similar to the method 400-A, by identifying RVs in the zone of interest (at block 450) and processing messages from those identified RVs (at block 460).

Alternative embodiments may vary from the methods 400 shown in FIGS. 4A and 4B. For example, the two-step process of method 400-A may be such that a plurality of contours are determined based on operating constraints, and a contour is then selected from the plurality of contours, based on road conditions. Additional or alternative factors may be taken into account to determine one or more contours. Additionally or alternatively, rather than defining contours based on a number of RVs of various RV types, a contour (area of interest) may be defined based on distance. The person of ordinary skill in the art will appreciate other such variations.

Once messages are filtered to exclude messages from RVs 130 outside an area of interest, embodiments may additionally employ techniques for prioritizing the messages based on a delay budget for each of the messages, which can help smooth processing requirements by delaying message processing where possible, as well as help ensure end-to-end delay budgets are met.

Figure 5:
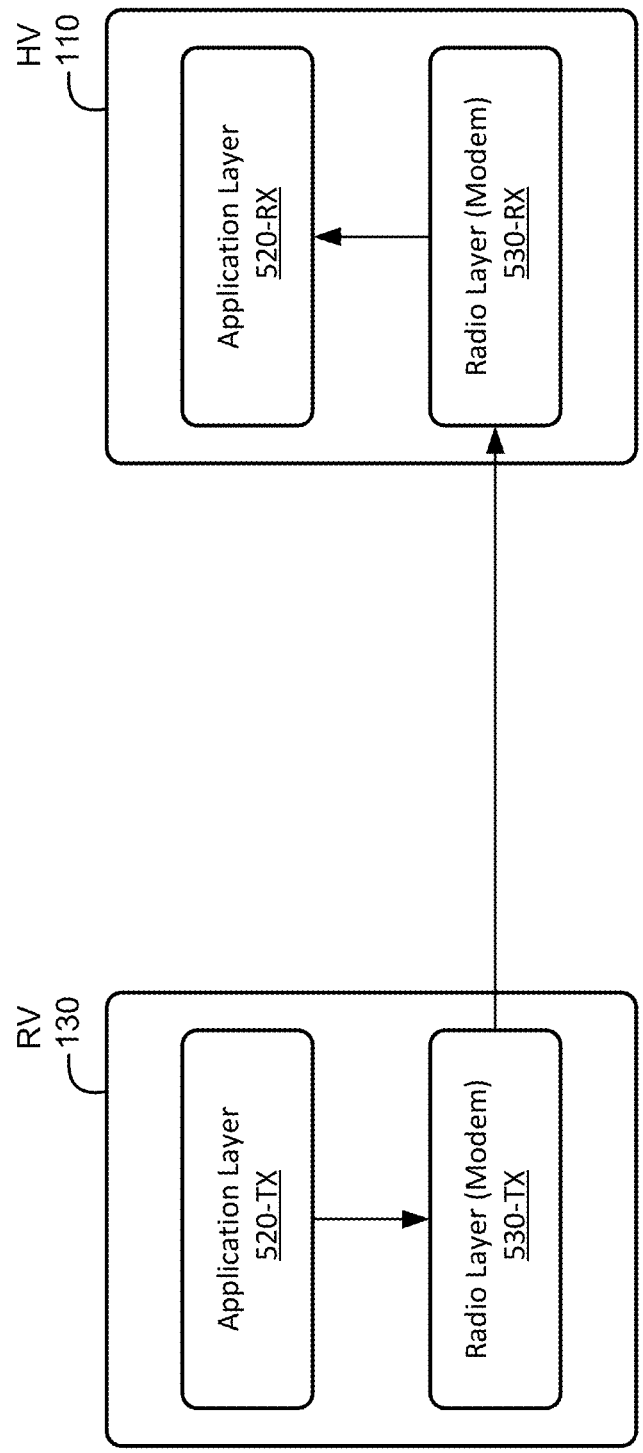
FIG. 5 is a simplified block diagram of relevant communication components of vehicles used to help illustrate the functionality of different components used for message prioritization, according to an embodiment.

FIG. 5 is a simplified block diagram of relevant communication components of an RV 130 and HV 110 used to help illustrate the functionality of different components used for message prioritization. It will be understood that the communication components shown may be executed by any number of hardware and/or software components of the RV 130 and HV 110, such as those illustrated in FIG. 10 and described below.

Here, each vehicle comprises an application layer 520 and radio layer 530. The application layer 520 may comprise (among other things) an Intelligent Transport Systems (ITS) stack, and may be communicatively coupled with a radio layer 530. As indicated previously, the application layer 520-RX of the HV 110 may determine the area of interest (e.g., define one or more contours 210) using the above-described techniques. The radio layer 530 may be executed at a modem of the respective vehicle, may comprise (among other things) a V2X stack and may be used to communicate messages from the RV 130 to the HV 110 (and vice versa).

As noted, traditional V2X messaging may provide indications of a delay budget used at the radio layer, but may not provide the framework for keeping an end-to-end delay budget for messages between the application layer 520-TX of the RV 130 and the application layer 520-RX of the HV 110. Embodiments herein may employ functionality at the application and/or radio layers to enable such a framework. An example of this is illustrated in FIG. 6.

Figure 6:
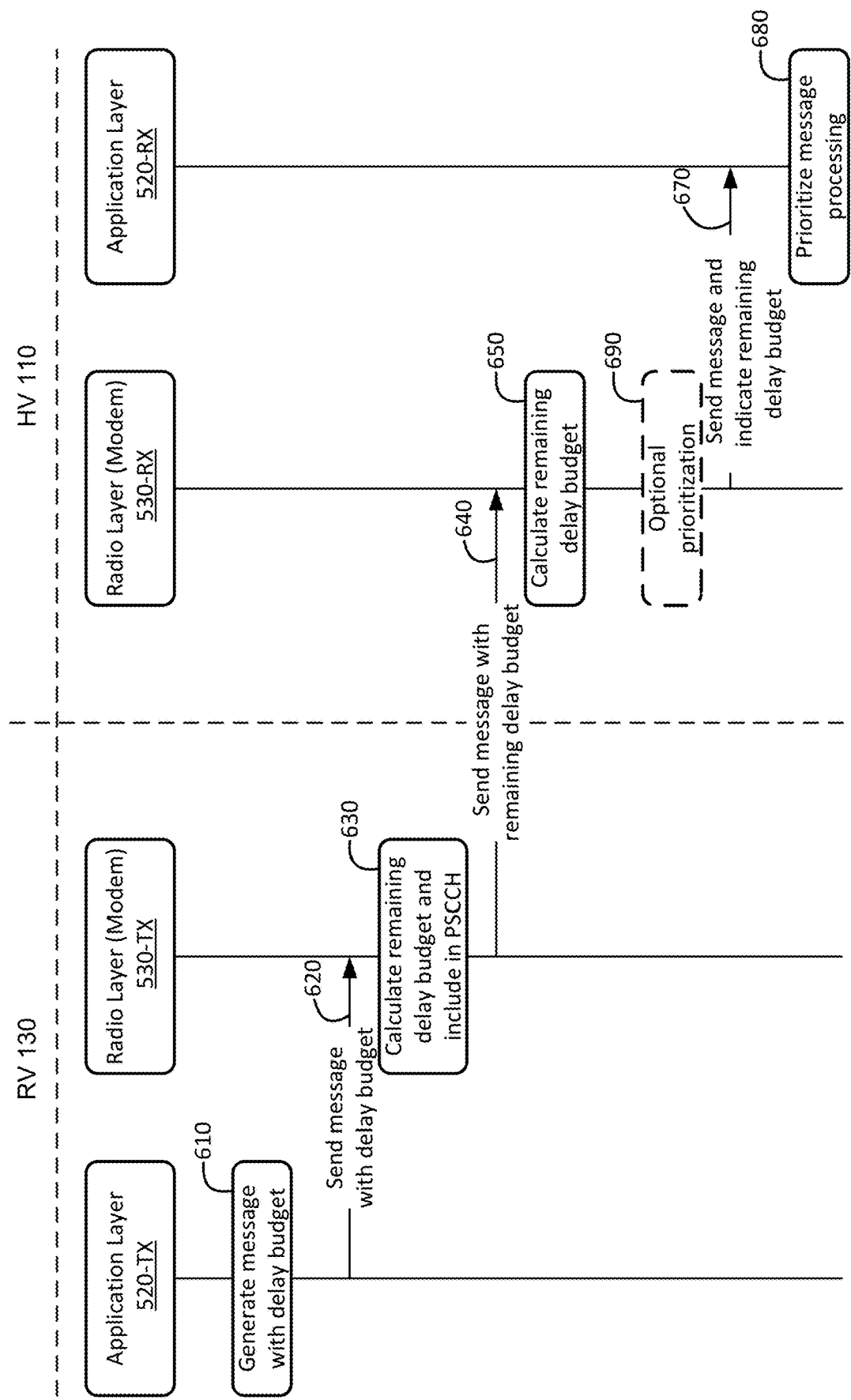
FIG. 6 is a call-flow diagram, illustrating functionality and communications between the various components illustrated in FIG. 5, to enable a vehicle to prioritize incoming messages, according to an embodiment.

FIG. 6 is a call-flow diagram, illustrating functionality and communications between the various components illustrated in FIG. 5, to enable the HV 110 to prioritize incoming messages, according to an embodiment. The functionality at block 610 comprises the application layer 520-TX generating a message with a corresponding delay budget. That is, according to embodiments, when creating a message (e.g., a BSM message), the application layer 520-TX may indicate a delay budget for the message to the radio layer 530-TX, as shown by arrow 620 in FIG. 6. In some embodiments, the delay budget may be mapped to a priority in a manner similar to Packet Delay Budgets are mapped to Pro se Per Packet Priority (PPPP) for packet data convergence protocol (PDCP)-layer communications. That is, certain priorities may be mapped to a particular delay budget. For example, higher priority levels may be mapped to smaller delay budgets (e.g., 20 ms or 50 ms) whereas lower priority levels may be mapped to higher delay budgets (e.g., 100 ms). As will be appreciated, embodiments may utilize any number of priority levels and/or delay budgets. Moreover, in some embodiments, delay budgets provided by the application layer 520-TX may not be linked to particular priority levels.

As shown in block 630, the radio layer 530-TX can then determine remaining delay budget. That is, with the delay budget for the message, the radio layer 530-TX can then calculate how much remaining delay budget will be left for the message once the radio layer 530-TX transmits the message. More specifically, the radio layer 530-TX can determine, based on the known time it takes between receiving messages from the application layer 520-TX to transmitting messages, how much time there will be remaining in the delay budget once the radio layer 530-TX transmits the message. It can communicate this remaining delay budget with the message using, for example, a reserve field in a Physical Sidelink Control Channel (PSCCH). This communication is shown by arrow 640 in FIG. 6.

The functionality at block 650 comprises, the radio layer 530-RX of the HV 110 calculating an updated remaining delay budget by calculating an amount of time it takes for the radio layer 530-RX to provide the message to the application layer 520-RX. Moreover, although over-the-air (OTA) delays may be relatively small, the radio layer 530-RX may also take OTA delays into account when computing the updated remaining delay budget. The message and the indication of the updated delay budget can then be provided to the application layer 520-RX, as shown by arrow 670.

Finally, with the message and remaining delay budget, the application layer 520-RX can then prioritize the message processing, as indicated at block 680. That is, the application layer 520-RX may place the message in a processing queue with other messages, based on the amount of remaining delay budget for the message. Thus, the processing of messages with little delay budget remaining can be conducted more quickly, while the processing of messages with a large amount of delay budget remaining can be conducted later. In this way, the application layer 520-RX has some flexibility in the timing of such processing, allowing the application layer 520-RX to smooth spikes in the processing load over time. This can also allow the application layer 520-RX to reduce or increase its operating frequency to accommodate reductions and/or increases in message processing requirements, given the amount of messages received and their corresponding delay budgets.

Some embodiments may employ some prioritization at the radio layer 530-RX of the HV 110, as illustrated by block 690. That is, according to some embodiments, the radio layer 530-RX may determine the amount of delay budget the message has left and prioritize providing the message to the application layer 520-RX accordingly. It can, for example, keep its own queue of messages, where the position of each message in the queue is based on the amount of delay budget remaining for each message. In some embodiments, the radio layer 530-RX may perform prioritization of incoming messages in this manner in addition or as an alternative to indicating the remaining delay budget to the application layer 520-RX.

Figure 7:
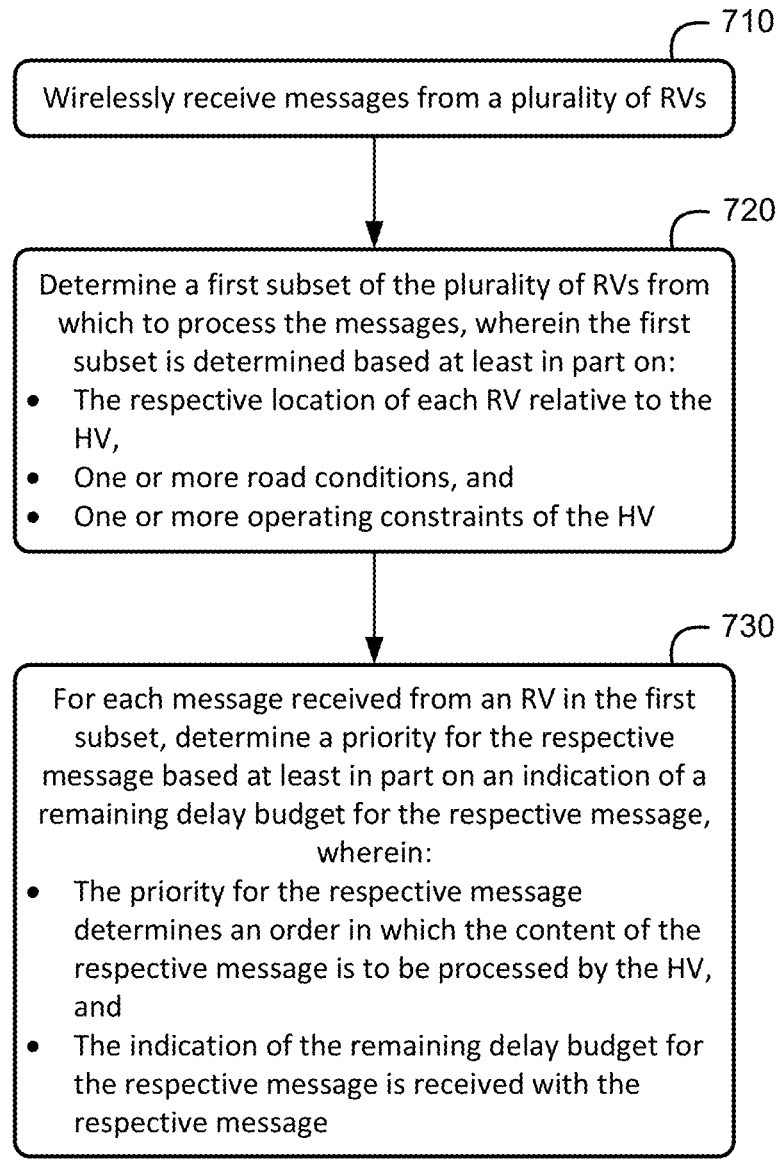
FIG. 7 is a flow diagram of a method of message selection and prioritization at a vehicle, according to an embodiment.

FIG. 7 is a flow diagram of a method of message selection and prioritization at an HV, according to an embodiment. As noted, the functionality of an HV may be implemented by hardware and/or software components of a vehicle, such as those illustrated in FIG. 10 and described below. As such, in some embodiments, one or more of the functions illustrated in the blocks of FIG. 7 may be performed by one or more of the hardware and/or computer components illustrated in FIG. 7. Furthermore, alternative embodiments may alter the functionality shown in the blocks of FIG. 7 by separating or combining blocks to perform functions in a different order, simultaneously, etc. A person of ordinary skill in the art will readily recognize such variations in view of the description herein.

The functionality of block 710 comprises wirelessly receiving messages from a plurality of RVs. As noted with regard to FIG. 1, these messages may be received directly from neighboring RVs within communication range. According to some embodiments, these messages may be received via V2X communication. In embodiments utilizing cellular communication (e.g., C-V2X) such embodiments may be made using, for example, a PC5 communication interface. As previously discussed, a remaining delay budget may accompany (included in and/or communicated with) each message for prioritization purposes. According to some embodiments, the messages may comprise V2X BSMs.

Figure 10:
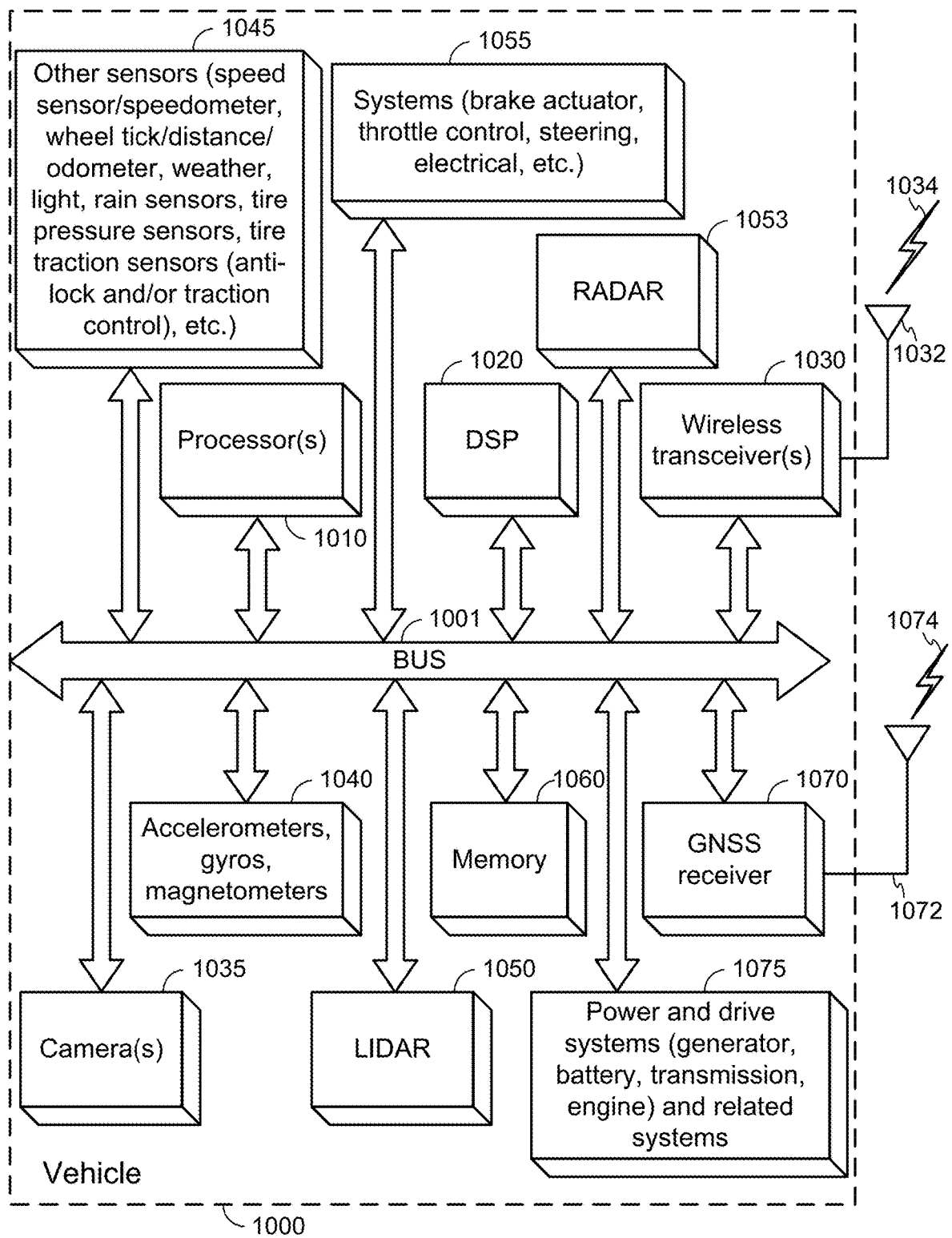
FIG. 10 is a block diagram of various hardware and software components of a vehicle, according to an embodiment.

Means for performing the functionality at block 710 may include one or more software and/or hardware components of a vehicle, such as a bus 1001, processor(s) 1010, memory 1060, wireless transceiver 1030, and/or other software and/or hardware components of a vehicle 10000 as illustrated in FIG. 10, which is described in more detail below.

The functionality shown by block 720 comprises determining a first subset of the plurality of RVs from which to process the messages, wherein the first subset is determined based at least in part on the respective location of HRV relative to the HV, one or more road conditions of road on which the HV is located, and one or more operating constraints of the HV. As detailed in the embodiments described above with regard to FIGS. 2A-4B, for example, the first subset may be determined using one or more contours to define one or more areas of interest in which the subset of the plurality of RVs is located. Thus, according to some embodiments, determining the first subset of the plurality of RVs comprises defining a plurality of subsets of the plurality of RVs, wherein each subset of the plurality of subsets comprises a different number of RVs from the plurality of RVs, and selecting the first subset from the plurality of subsets based on the one or more operating constraints. As noted, each subset may be defined by contours of different orders defining different areas of interest, and the contour may be chosen based on its order and the operating conditions of the HV. Moreover, according to some embodiments, defining each subset of the plurality of subsets can be based at least in part on the one or more road conditions.

As noted in the previously-described embodiments, the one or more road conditions and one or more operating constraints may include any of a variety of related factors. For example, according to some embodiments, the one or more road conditions may comprise a number of lanes of the road, a current lane of the HV, a speed limit of the road, a road hazard, a weather condition, a curvature of the road, speed of the HV, heading of the HV, or a trajectory of one or more RVs of the plurality of RVs, or any combination thereof. According to some embodiments, the one or more operating constraints of the HV may comprise a message processing capability, a thermal constraint, a concurrency constraint, or any combination thereof.

Means for performing the functionality at block 720 may include one or more software and/or hardware components of a vehicle, such as a bus 1001, processor(s) 1010, memory 1060, wireless transceiver(s) 1030, and/or other software and/or hardware components of a vehicle 10000 as illustrated in FIG. 10.

At block 730, the functionality comprises, for each message received from an RV in the first subset, determining a priority for the respective message based at least in part on an indication of a remaining delay budget for the respective message, wherein the priority for the respective message determines an order in which the content of the respective message is to be processed by the HV, and the indication of the remaining delay budget for the respective message is received with the respective message. As noted in the previously-described embodiments, the respective message may include or be accompanied by a remaining delay budget determined by a radio layer of the RV transmitting the respective message, which can be utilized by a radio layer and/or application layer of the HV to help ensure an end-to-end delay budget is met. In some embodiments, for example, determining the priority for the respective message comprises obtaining, at a radio layer of the HV, the indication of the remaining delay budget for the respective message of the respective message, and providing, from the radio layer to an application layer of the HV, the indication of the remaining delay. In some embodiments, providing the indication of the remaining delay may comprise providing a modified indication of the remaining delay to account for (i) delay of the radio layer and (ii) OTA delay. Additionally or alternatively, the radio layer of the HV can obtain the indication of the remaining delay budget for the respective message via a PSCCH for the respective message.

Means for performing the functionality at block 730 may include one or more software and/or hardware components of a vehicle, such as a bus 1001, processor(s) 1010, memory 1060, wireless transceiver(s) 1030, and/or other software and/or hardware components of a vehicle 1000 as illustrated in FIG. 10. According to some embodiments, for example, the radio layer may be executed by the wireless transceiver(s) 1030 and the application layer may be executed by the processor(s) 1010 and/or DSP 1020.

As noted in the above-described embodiments, the functionality performed at block 720 may include filtering of messages from RVs in the plurality of RVs that are not in the first subset. This filtering may be performed at the radio layer (e.g., modem), application layer, or combination of both. Additionally or alternatively, the message sorting (e.g., the functionality at block 730) for messages coming from RVs in the first subset can be done in radio layer (e.g., optional prioritization at block 690 of radio layer 530-Rx in FIG. 6) or application layer (e.g., prioritize message processing at block 680 by application layer 520-Rx in FIG. 6) or a combination of both.

Figure 8:
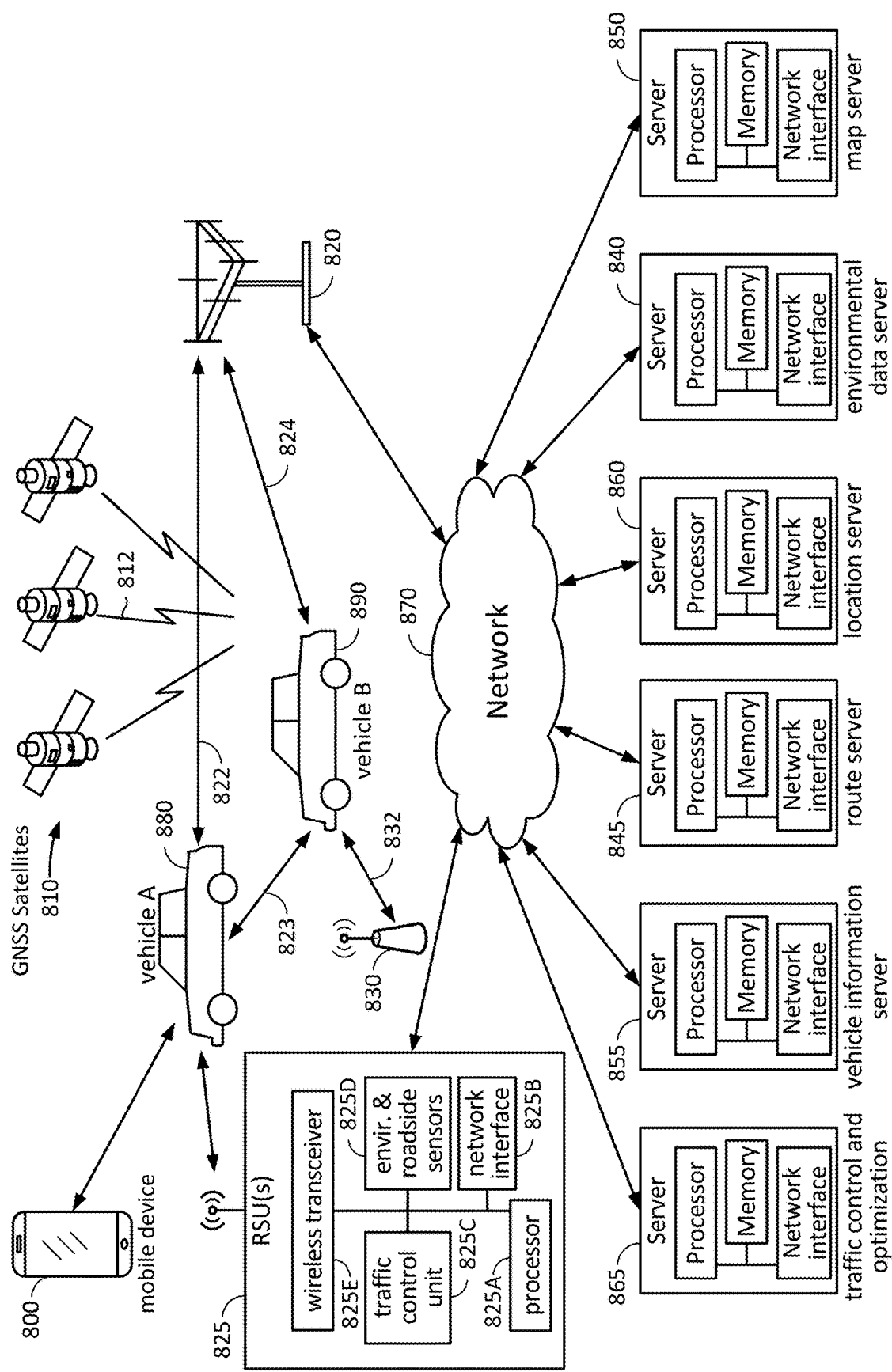
FIG. 8 is an illustration of a system in which vehicles may communicate over various networks and with various devices, vehicles, and servers, according to an embodiment.
Figure 9:
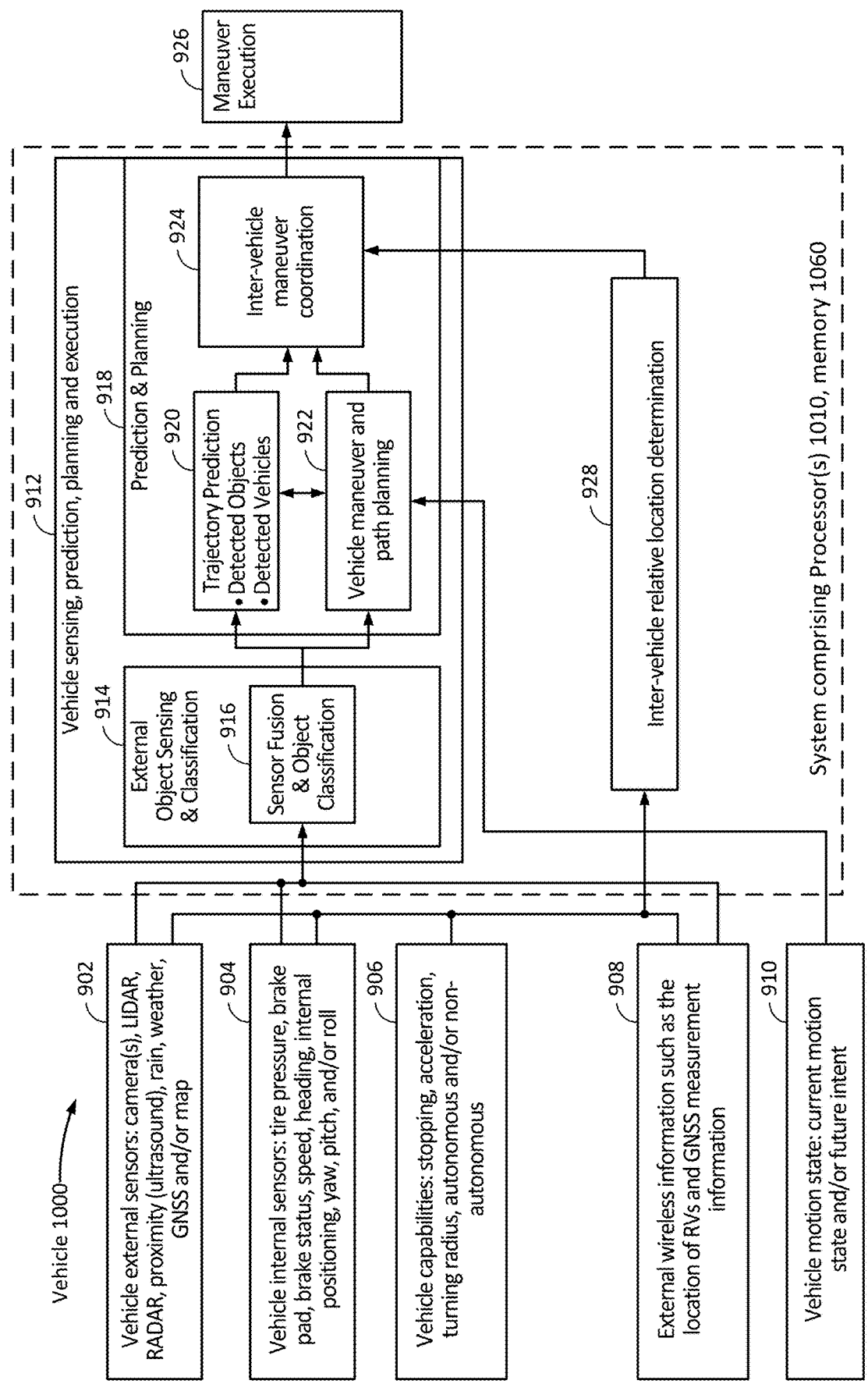
FIG. 9 comprises a functional block diagram of a vehicle 1000, according to an embodiment.

FIGS. 8-10 are illustrations of systems, structural devices, vehicle components, and other devices, components, and systems that can be used to implement the techniques provided herein for message filtering and prioritization at an HV 110. In the description below, HVs 110 and RVs 130 as used in the previously-described embodiments are referred to generically simply as "vehicles."

FIG. 8 is an illustration of a system in which vehicles (e.g., HV and/or RV) may communicate over various networks and with various devices, vehicles, and servers, according to an embodiment. In an embodiment, V2X vehicle A 880 may communicate, using V2X or other wireless communication transceiver over link 823, with V2X or otherwise communication-transceiver-enabled vehicle B 890, for example, in an embodiment to perform inter-vehicle relative positioning, negotiation for lane changes or for passage through an intersection, and to exchange V2X data elements such as Global Navigation Satellite System (GNSS) measurements, vehicle status, vehicle location and vehicle abilities, measurement data, and/or calculated status, and to exchange other V2X vehicle status steps that may not be covered in the V2X capability data elements. In an embodiment, vehicle A 880 may also communicate with vehicle B 890 through a network, for example, via wireless signals 822 to/from base station 820 and/or via wireless signals 832 to/from an access point 830, or via one or more communication-enabled RSU(s) 825, any of which may relay communication, information and/or convert protocols for use by other vehicles, such as vehicle B 890, particularly in an embodiment where vehicle B 890 is not capable of communicating directly with vehicle A 880 in a common protocol. In an embodiment, RSU(s) may comprise various types of roadside beacons, traffic and/or vehicular monitors, traffic control devices, and location beacons.

In an embodiment, RSU(s) 825 may have a processor 825A configured to operate wireless transceiver 825E to send and receive wireless messages, for example, BSM or Cooperative Awareness Messages (CAM) or other V2X messages to/from vehicle A 880 and/or vehicle B 890, from base station 820 and/or access point 830. For example, wireless transceiver 825E may send and/or receive wireless messages in various protocols such as V2X communication with vehicles, and/or using various Wide Area Network (WAN), Wireless Local Area Network (WLAN), and/or Personal Area Network (PAN) protocols to communicate over a wireless communication network. In an embodiment RSU(s) 825 may contain one or more processors 825A communicatively coupled to wireless transceiver 825E and memory, and may contain instructions and/or hardware to perform as a traffic control unit 825C and/or to provide and/or process environmental and roadside sensor information 825D or to act as a location reference for GNSS relative location between it and vehicles. In an embodiment, RSU(s) 825 may contain a network interface 825B (and/or a wireless transceiver 825E), which, in an embodiment, may communicate with external servers such as traffic optimization server 865, vehicle information server 855, and/or environmental data server 840. In an embodiment, wireless transceiver 825E may communicate over a wireless communication network by transmitting or receiving wireless signals from a wireless Base Transceiver Subsystem (BTS), a Node B or an evolved NodeB (eNodeB) or a next generation NodeB (gNodeB) over wireless communication link. In an embodiment, wireless transceiver(s) 825E may comprise various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 825 over a wireless link, and claimed subject matter is not limited in this respect.

RSU(s) 825 may receive location, status, GNSS and other sensor measurements, and capability information from vehicle A 880 and/or vehicle B 890 such as GNSS measurements, sensor measurements, velocity, heading, location, stopping distance, priority or emergency status and other vehicle-related information. In an embodiment, environmental information such as road surface information/status, weather status, and camera information may be gathered and shared with vehicles, either via point to point or broadcast messaging. RSU(s) 825 may utilize received information, via wireless transceiver 825E, from vehicle A 880 and/or vehicle B 890, environmental and roadside sensors 825D, and network information and control messages from, for example, traffic control and optimization server 865 to coordinate and direct traffic flow and to provide environmental, vehicular, safety and announcement messages to vehicle A 880 and vehicle B 890.

Processor 825A may be configured to operate a network interface 825B, in an embodiment, which may be connected via a backhaul to network 870, and which may be used, in an embodiment, to communicate and coordinate with various centralized servers such as a centralized traffic control and optimization server 865 that monitors and optimizes the flow of traffic in an area such as within a city or a section of a city or in a region. Network interface 825B may also be utilized for remote access to RSU(s) 825 for crowd sourcing of vehicle data, maintenance of the RSU(s) 825, and/or coordination with other RSU(s) 825 or other uses. RSU(s) 825 may have a processor 825A configured to operate traffic control unit 825C which may be configured to process data received from vehicles such as vehicle A 880 and vehicle B 890 such as location data, stopping distance data, road condition data, identification data and other information related to the status and location of nearby vehicles and environment. RSU(s) 825 may have a processor 825A configured to obtain data from environmental and roadside sensors 825D, which may include temperature, weather, camera, pressure sensors, road sensors (for car detection, for example), accident detection, movement detection, speed detection and other vehicle and environmental monitoring sensors.

In an embodiment, vehicle A 880 may also communicate with mobile device 800 using short range communication and personal networks such as Bluetooth, Wi-Fi or Zigbee or via V2X or other vehicle-related communication protocols, for example, in an embodiment to access WAN and/or Wi-Fi networks and/or, in an embodiment, to obtain sensor and/or location measurements from mobile device 800. In an embodiment, vehicle A 880 may communicate with mobile device 800 using WAN related protocols through a WAN network, such as via WAN base station 820 or using Wi-Fi either directly peer to peer or via a Wi-Fi access point. Vehicle A 880 and/or vehicle B 890 may communicate using various communication protocols. In an embodiment, vehicle A 880 and/or vehicle B 890 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A may communicate over WAN networks using WAN protocols via base station 820 or with wireless LAN access point 830 using wireless LAN protocols such as Wi-Fi. A vehicle may also support wireless communication using a WLAN, PAN (such as Bluetooth or ZigBee), Digital Subscriber Line (DSL) or packet cable for example.

Vehicle A 880 and/or vehicle B 890, in an embodiment, may contain one or more GNSS receivers such as GNSS receiver 1070 for reception of GNSS signals 812, from GNSS satellites 810, for location determination, time acquisition and time maintenance. Various GNSS systems may be supported alone or in combination, using GNSS receiver 1070 or other receiver, to receive signals from Beidou, Galileo, GLONASS, and/or Global Positioning System (GPS), and various regional navigational systems such as Quasi-Zenith Satellite System (QZSS) and NavIC or Indian Regional Navigation Satellite System (IRNSS). Other wireless systems may be utilized such as those depending on beacons such as, in an example, one or more RSU(s) 825, one or more wireless LAN access point 830 or one or more base stations 820. Various GNSS signals 812 may be utilized in conjunction with car sensors to determine location, velocity, proximity to other vehicles such as between vehicle A 880 and vehicle B 890.

In an embodiment, vehicle A and/or vehicle B may access GNSS measurements and/or locations determined at least in part using GNSS as provided by mobile device 800, which, in an embodiment would also have GNSS, WAN, Wi-Fi and other communications receivers and/or transceivers. In an embodiment, vehicle A 880 and/or vehicle B 890 may access GNSS measurements (such as pseudorange measurements, Doppler measurements and satellite IDs) and/or locations determined at least in part using GNSS as provided by mobile device 800 as a fallback in case GNSS receiver 1070 fails or provides less than a threshold level of location accuracy.

Vehicle A 880 and/or Vehicle B 890 may access various servers on the network such as vehicle information server 855, route server 845, location server 860, map server 850, and environmental data server 840.

Vehicle information server 855, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 855 may also provide information in regard to vehicle size, shape, capabilities, identification, ownership, occupancy, and/or determined location point (such as, for example, the location of the GNSS receiver) and the location of the car boundaries relative to the determined location point.

Route server 845, may receive current location and destination information, and provide routing information for the vehicle, map data, alternative route data and/or traffic and street conditions data.

Location server 860, in an embodiment, may provide location determination capabilities, transmitter signal acquisition assistance (such as GNSS satellite orbital predictions information, time information approximate location information and/or approximate time information), transceiver almanacs such as those containing identification of and location for Wi-Fi access points and base stations, and, in some embodiments, additional information relative to the route such as speed limits, traffic, and road status/construction status. Map server 850 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 840 may, in an embodiment, provide weather and/or road related information, traffic information, terrain information, and/or road quality & speed information and/or other pertinent environmental data.

In an embodiment, Vehicles 880 and 890 and mobile devices 800, in FIG. 8, may communication over network 870 via various network access points such as wireless LAN access point 830 or wireless WAN base station 820 over network 870. Vehicles 880 and 890 and mobile devices 800 may also, in some embodiments, communicate directly between devices, between vehicles and device to vehicle and vehicle to device using various short range communications mechanisms to communicate directly without going over network 870, such as via Bluetooth, Zigbee and 5G new radio standards.

FIG. 9 comprises a functional block diagram of a vehicle 1000, according to an embodiment. The vehicle 1000 we correspond to an HV 110 and/or RV 130, as described in the embodiments above. Moreover, hardware and/or software components for executing the blocks shown in FIG. 9 are illustrated in FIG. 10 and described in more detail below.

As shown in FIG. 9, vehicle 1000 may receive vehicle and environment information from vehicle external sensors 902, vehicle internal sensors 904, vehicle capabilities 906, external wireless information such as the location of RVs and GNSS measurement information 908 (from the environment, from other vehicles, from RSU(s), from system servers) and/or from vehicle motion state 910 (describing current and/or future motion states). The messages received by an HV 110 from RVs 130 described in the embodiments above, for example, may convey the data provided in blocks 908 and/or 910. The received vehicle, sensor, and environment information may, in an embodiment, be processed in one or more processor(s) 1010, DSP(s) 1020 and memory 1060 (shown in FIG. 10), connected and configured to provide external object sensing and classification, prediction and planning, and maneuver execution, as well as to determine and update V2X or other wireless data element values, including GNSS data element values, and to transmit, via one or more wireless transceivers 1030, messaging including the determined data elements. The messaging and data elements may be sent and received via various means, protocols and standards, such as via SAE or European Telecommunications Standards Institute (ETSI) CV2X messages and data elements or other wireless and wireless V2X protocols supported by wireless transceiver(s) 130.

Inter-vehicle relative location determination block 928 may be used to determine relative location of vehicles in an area of interest. In an embodiment, GNSS data is exchanged with vehicles (e.g., RVs), or other devices such as RSUs, to determine and/or verify and/or increase the accuracy of a relative location associated with other vehicles or devices. In one embodiment, determining vehicles (or other devices) within an area of interest may utilize broadcast location information such as broadcast latitude and longitude received in messages (e.g., BSMs) from other vehicles other devices and location information for vehicle 1000 to determine an approximate relative location and/or an approximate range between vehicles. This information can be used by an HV 110, for example, to define contours 210 as described in the embodiments above, and/or identify RVs 130 within an area of interest.

In an embodiment, other vehicle-related input sources, such as servers 855, 845, 860, 850, and 840, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination 924 to determine maneuver execution 926. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 850 may be utilized in conjunction with relative and/or absolute data from neighboring vehicles and/or from RSU(s) 825 to determine high confidence absolute location for a plurality of vehicles and relative location with respect to the road/map. For example, if vehicle A 880 has high accuracy/high confidence location than other vehicles in communication with vehicle A 880, such as vehicle B 890 may use GNSS information for a highly accurate relative location and the highly accurate location from vehicle A 880 sent to vehicle B 890 to determine a highly accurate location for vehicle B 890, even if the systems of vehicle B 890 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 850 is accurate, the ability to propagate highly accurate location data from vehicle A 880 to surrounding vehicles such as vehicle B 890 enables the surrounding vehicles to also accurately determine their relative location versus the map data, even in otherwise troublesome signal/location environments. Vehicle information server 855 may provide vehicle information such as size, shape, and antenna location which may be utilized, for example, by vehicle A or other vehicles to determine not just the relative location between the GNSS receiver on vehicle A 880 and, for example, vehicle B 890, but also the distance between the closest points of Vehicle A 880 and Vehicle B 890. In an embodiment, traffic information from the traffic control and optimization server 865 may be utilized to determine overall path selection and rerouting, used in conjunction with route server 845 (in an embodiment). In an embodiment, environmental data server 840 may provide input on road conditions, black ice, snow, water on the road and other environmental conditions which may also impact the decisions and decision criteria in inter-vehicle maneuver coordination block 924 and maneuver execution block 926. For example, in icy or rainy conditions, the vehicle 1000 may execute and/or request increased inter-vehicle distance from adjacent vehicles or may choose route options that avoid road hazard conditions such as black ice and standing water.

Block 928 may be implemented using various dedicated or generalized hardware and software, such as using processor 1010 and/or DSP 1020 and memory 1060 (again, as shown in FIG. 10) or, in an embodiment, in specialized hardware blocks such as dedicated sensor processing and/or vehicle messaging cores. According to some embodiments, the location of nearby vehicles may be determined through various means such as based on signal-based timing measurements such as Round-Trip Time (RTT) and Time Of Arrival (TOA), signal strength of a broadcast signal for vehicles, and a distance determined based upon broadcast latitude and longitude from a neighboring vehicle and the current location of the vehicle. Additionally or alternatively, location of nearby vehicles may be determined from sensor measurements such as LIght Detection And Ranging (LIDAR), RAdio Detection And Ranging (RADAR), SONAR, and camera measurements. In an embodiment, some or all of blocks 902, 904, 906, 908 and/or 910 may have dedicated processing cores, for example, to improve performance and reduce measurement latency. In an embodiment, some or all of blocks 902, 904, 906, 908 and/or 910 may share processing with block 928.

Vehicle external sensors 902 may comprise, in some embodiments, cameras, LIDAR, RADAR, proximity sensors, rain sensors, weather sensors, GNSS receivers 1070 and received data used with the sensors such as map data, environmental data, location, route and/or other vehicle information such as may be received from other vehicles, devices and servers such as, in an embodiment, map server 850, route server 845, vehicle information server 855, environmental data server 840, location server 860, and/or from associated devices such as mobile device 800, which may be present in or near to the vehicle such as vehicle A 880. For example, in an embodiment, mobile device 800 may provide an additional source of GNSS measurements, may provide an additional source of motion sensor measurements, or may provide network access as a communication portal to a WAN, Wi-Fi or other network, and as a gateway to various information servers such as servers 840, 845, 850, 855, 860, and/or 865.

Figure 11:
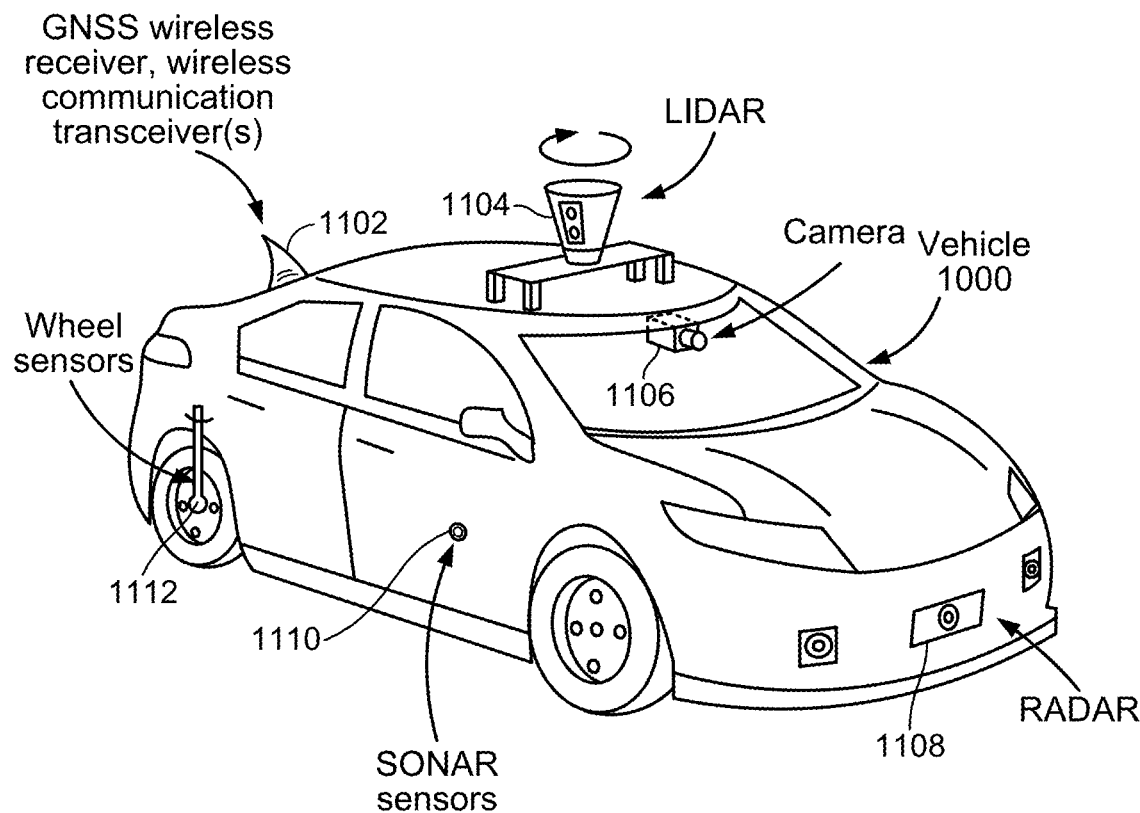
FIG. 11 is a perspective view of an example vehicle 1000, according to an embodiment.

It is understood that the vehicle 1000 may contain one or a plurality of cameras. In an embodiment, a camera may be front facing, side facing, rear facing or adjustable in view (such as a rotatable camera). As shown in FIG. 11, for example, there may be multiple cameras 1106 facing the same plane. For example, the cameras 1106 and bumper-mounted camera at 1108 may comprise two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 1104 may be roof mounted and rotating or may be focused on a particular point of view (such as front facing, rear facing, side facing). LIDAR 1104 may be solid state or mechanical. Proximity sensors may be ultrasonic, RADAR-based, light-based (such as based on infrared range finding), and/or capacitive (surface touch oriented or capacitive detection of metallic bodies). Rain and weather sensors may include various sensing capabilities and technologies such as barometric pressure sensors, moisture detectors, rain sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 904 may comprise wheel sensors 1112 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 904 and vehicle external sensors 902 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 928 to determine vehicle location. The car status values derived from measurements from internal and external sensors may be further combined with car status values and/or measurements from other sensor systems using a general or applications processor. For example, blocks 928 and/or 924 or may be implemented on a dedicated or a centralized processor to determine data element values for V2X messaging which may be sent utilizing wireless transceivers 1030 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless transceiver(s) 1030 and antenna(s) 1032.

In an embodiment, vehicle capabilities 906 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive trains may share performance estimates for drive-performance related estimates such as breaking/stopping distance, turning radius, and acceleration performance. Vehicle performance estimates may also be obtained, for example, using external V2X input(s) 908, over a wireless network from vehicular data servers on the network. This is particularly helpful to obtain information for vehicles that are not wireless capable and cannot provide vehicular information directly. In an embodiment, vehicle capabilities 906 may also be influenced by car component status such as tire wear, tire brand capabilities, brake pad wear, brake brand and capabilities, and engine status. In an embodiment, vehicle capabilities 906 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 902 and/or vehicle internal sensors 904, may be weighted more heavily and/or given preference in determining capability.

V2X vehicle sensing, prediction, planning execution 912 handles the receipt and processing of information from blocks 902, 904, 906, 908 and 910, via external object sensing and classification block 914, in part utilizing sensor fusion and object classification block 916 to correlate, corroborate and/or combine data from input blocks 902, 904, 906, 908 and 910. Block 914 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 914 may utilize GNSS measurement messages from other vehicles to determine the relative positioning to other vehicles. This output from block 914 may be provided to prediction and planning block 918, which determines detected objects and vehicles and their associated trajectory via block 920 and determines vehicle maneuver and path planning in block 922, the outputs of which are utilized in block 926 vehicle maneuver execution either directly or via V2X inter-vehicle negotiation block 924, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 10 is a block diagram of various hardware and software components of a vehicle 1000, according to an embodiment. Again, the vehicle 1000 may correspond with the HV 110 and/or RVs 130 described in the embodiments above. Further, the vehicle may comprise for example, a car, truck, motorcycle and/or other motorized vehicle, may transmit radio signals to, and receive radio signals from, other vehicles 1000, for example, via V2X car to car communication (for example, using one of the CV2X vehicle to vehicle communication protocols), and/or from a wireless communication network 870, in an embodiment, via WAN, base station 820, and/or wireless access point 830, and/or from RSU(s) 825. In one example, vehicle 1000 (e.g., vehicle 880) may communicate, via wireless transceiver(s)

1030 and wireless antenna(s) 1032 with other vehicles (e.g., vehicle 890) and/or wireless communication networks by transmitting wireless signals to, or receiving wireless signals from a remote wireless transceiver which may comprise another vehicle 890, a base station 820 (e.g., a NodeB, eNodeB, or gNodeB) or wireless access point 830, over a wireless communication link.

Similarly, vehicle 1000 may transmit wireless signals to, or receive wireless signals from a local transceiver over a wireless communication link, for example, by using a WLAN and/or a PAN wireless transceiver, here represented by one of wireless transceiver(s) 1030 and wireless antenna(s) 1032. In an embodiment, wireless transceiver(s) 1030 may comprise various combinations of WAN, WLAN, and/or PAN transceivers. In an embodiment, wireless transceiver(s) 1030 may also comprise a Bluetooth transceiver, a ZigBee transceiver, or other PAN transceiver. In an embodiment, vehicle 1000 may transmit wireless signals to, or receive wireless signals from a wireless transceiver 1030 on a vehicle 1000 over wireless communication link 1034. A local transceiver, a WAN wireless transceiver and/or a mobile wireless transceiver may comprise a WAN transceiver, an access point (AP), femtocell, Home Base Station, small cell base station, HNB, HeNB, or gNodeB and may provide access to a wireless local area network (WLAN, e.g., IEEE 802.11 network), a wireless personal area network (PAN, e.g., Bluetooth network) or a cellular network (e.g., an LTE network or other wireless wide area network such as those discussed in the next paragraph). Of course, it should be understood that these are merely examples of networks that may communicate with a vehicle over a wireless link, and claimed subject matter is not limited in this respect. It is also understood that wireless transceiver(s) 1030 may be located on various types of vehicles 1000, such as boats, ferries, cars, buses, drones, and various transport vehicles. In an embodiment, the vehicle 1000 may be utilized for passenger transport, package transport or other purposes. In an embodiment, GNSS signals 1074 from GNSS Satellites are utilized by vehicle 1000 for location determination and/or for the determination of GNSS signal parameters and demodulated data. In an embodiment, signals 1034 from WAN transceiver(s), WLAN and/or PAN local transceivers are used for location determination, alone or in combination with GNSS signals 1074.

Examples of network technologies that may support wireless transceivers 1030 are GSM, CDMA, WCDMA, LTE, 5G or New Radio Access Technology (NR), HRPD, and V2X car-to-car communication. As noted, V2X communication protocols may be defined in various standards such as SAE and ETS-ITS standards. GSM, WCDMA and LTE are technologies defined by 3GPP. CDMA and HRPD are technologies defined by the $3^{rd}$ Generation Partnership Project II (3GPP2). WCDMA is also part of the Universal Mobile Telecommunications System (UMTS) and may be supported by an HNB.

Wireless transceivers 1030 may communicate with communications networks via WAN wireless base stations which may comprise deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 5G NR base stations. In an embodiment, further wireless base stations may comprise a WLAN and/or PAN transceiver.

In an embodiment, vehicle 1000 may contain one or more cameras 1035. In an embodiment, the camera may comprise a camera sensor and mounting assembly. Different mounting assemblies may be used for different cameras on vehicle 1000. For example, front facing cameras may be mounted in the front bumper, in the stem of the rear-view mirror assembly or in other front facing areas of the vehicle 1000. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modified accordingly to update estimated parameters based on camera and other sensor measurements).

Accelerometers, gyros and magnetometers 1040, in an embodiment, may be utilized to provide and/or verify motion and directional information. Accelerometers and gyros may be utilized to monitor wheel and drive train performance. Accelerometers, in an embodiment, may also be utilized to verify actual time of impact with road hazards such as pot holes relative to predicted times based on existing stopping and acceleration models as well as steering models. Gyros and magnetometers may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors 1045 such as speed sensors, wheel tick sensors, and/or odometer measurements.

LIDAR 1050 uses pulsed laser light to measure ranges to objects. While cameras may be used for object detection, LIDAR 1050 provides a means, to detect the distances (and orientations) of the objects with more certainty, especially in regard to objects of unknown size and shape. LIDAR 1050 measurements may also be used to estimate rate of travel, vector directions, relative position and stopping distance by providing accurate distance measurements and delta distance measurements.

Memory 1060 may be utilized with processor 1010 and/or DSP 1020, which may comprise Random Access Memory (RAM), Read-Only Memory (ROM), disc drive, FLASH, or other memory devices or various combinations thereof. In an embodiment, memory 1060 may contain instructions to implement various methods described throughout this description including, for example, processes to implement the use of relative positioning between vehicles and between vehicles and external reference objects such as roadside units. In an embodiment, memory may contain instructions for operating and calibrating sensors, and for receiving map, weather, vehicular (both vehicle 1000 and surrounding vehicles, e.g., HV 110 and RVs 130) and other data, and utilizing various internal and external sensor measurements and received data and measurements to determine driving parameters such as relative position, absolute position, stopping distance, acceleration and turning radius at current speed and/or maneuverability at current speed, inter-car distance, turn initiation/timing and performance, and initiation/timing of driving operations.

In an embodiment, power and drive systems (generator, battery, transmission, engine) and related systems 1075 and systems (brake, actuator, throttle control, steering, and electrical) 1055 may be controlled by the processor(s) and/or hardware or software or by an operator of the vehicle or by some combination thereof. The systems (brake, actuator, throttle control, steering, electrical, etc.) 1055 and power and drive or other systems 1075 may be utilized in conjunction with performance parameters and operational parameters, to enable autonomously (and manually, relative to alerts and emergency overrides/braking/stopping) driving and operating a vehicle 1000 safely and accurately, such as to safely, effectively and efficiently merge into traffic, stop, accelerate and otherwise operate the vehicle 1000. In an embodiment, input from the various sensor systems such as camera 1035, accelerometers, gyros and magnetometers 1040, LIDAR 1050, GNSS receiver 1070, RADAR 1053, input, messaging and/or measurements from wireless transceiver(s) 1030 and/or other sensors 1045 or various combinations thereof, may be utilized by processor 1010 and/or DSP 1020 or other processing systems to control power and drive systems 1075 and systems (brake actuator, throttle control, steering, electrical, etc.) 1055.

A global navigation satellite system (GNSS) receiver 1070 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver 1070, may receive RF signals 1074 from GNSS satellites (e.g., RF signals 812 from GNSS satellites 810) using one or more antennas 1072 (which, depending on functional requirements, may be the same as antennas 1032). The GNSS receiver 1070 may support one or more GNSS constellations as well as other satellite-based navigation systems. For example, in an embodiment, GNSS receiver 1070 may support global navigation satellite systems such as GPS, the GLONASS, Galileo, and/or BeiDou, or any combination thereof. In an embodiment, GNSS receiver 1070 may support regional navigation satellite systems such as NavIC or QZSS or a combination thereof as well as various augmentation systems (e.g., Satellite Based Augmentation Systems (SBAS) or ground based augmentation systems (GBAS)) such as Doppler Orbitography and Radio-positioning Integrated by Satellite (DORIS) or wide area augmentation system (WAAS) or the European geostationary navigation overlay service (EGNOS) or the multi-functional satellite augmentation system (MSAS) or the local area augmentation system (LAAS). In an embodiment, GNSS receiver(s) 1030 and antenna(s) 1032 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver 1070 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared Doppler and/or pseudorange measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR and other distance estimation techniques. GNSS Doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from RSUs, to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an RSU equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

RADAR 1053, uses transmitted radio waves that are reflected off of objects. The reflected radio waves are analyzed, based on the time taken for reflections to arrive and other signal characteristics of the reflected waves to determine the location of nearby objects. RADAR 1053 may be utilized to detect the location of nearby cars, roadside objects (signs, other vehicles, pedestrians, etc.) and will generally enable detection of objects even if there is obscuring weather such as snow, rail or hail. Thus, RADAR 1053 may be used to complement LIDAR 1050 systems and camera 1035 systems in providing ranging information to other objects by providing ranging and distance measurements and information when visual-based systems typically fail. Furthermore, RADAR 1053 may be utilized to calibrate and/or sanity check other systems such as LIDAR 1050 and camera 1035. Ranging measurements from RADAR 1053 may be utilized to determine/measure stopping distance at current speed, acceleration, maneuverability at current speed and/or turning radius at current speed and/or a measure of maneuverability at current speed. In some systems, ground penetrating RADAR may also be used to track road surfaces via, for example, RADAR-reflective markers on the road surface or terrain features such as ditches.

FIG. 11 is a perspective view of an example vehicle 1000, according to an embodiment. Here, some of the components discussed with regard to FIG. 10 and earlier embodiments are shown. As illustrated and previously discussed, the vehicle 1000 can have camera(s) such as rear view mirror-mounted camera 1106, front fender-mounted camera (not shown), side mirror-mounted camera (not shown) and a rear camera (not shown, but typically on the trunk, hatch or rear bumper). Vehicle 1000 may also have LIDAR 1104, for detecting objects and measuring distances to those objects; LIDAR 1104 is often roof-mounted, however, if there are multiple LIDAR units 1104, they may be oriented around the front, rear and sides of the vehicle. Vehicle 1000 may have other various location-related systems such as a GNSS receiver 1070 (typically located in the shark fin unit on the rear of the roof, as indicated), various wireless transceivers (such as WAN, WLAN, V2X; typically, but not necessarily, located in the shark fin) 1102, RADAR 1108 (typically in the front bumper), and SONAR 1110 (typically located on both sides of the vehicle, if present). Various wheel 1112 and drive train sensors may also be present, such as tire pressure sensors, accelerometers, gyros, and wheel rotation detection and/or counters. In an embodiment, distance measurements and relative locations determined via various sensors such as LIDAR, RADAR, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. E.g., the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 11 is intended to provide exemplary locations of various sensors in an embodiment of vehicle 1000.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., memory 1060 of FIG. 10) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of message selection and prioritization at a host vehicle (HV), the method comprising:
 wirelessly receiving messages from a plurality of remote vehicles (RVs);
 determining a first subset of the plurality of RVs from which to process the messages, wherein the first subset is determined based at least in part on:
  the respective location of each RV relative to the HV,
  one or more road conditions, and
  one or more operating constraints of the HV; and
 for each message received from an RV in the first subset, determining a priority for the respective message based at least in part on an indication of a remaining delay budget for the respective message, wherein:
  the priority for the respective message determines an order in which content of the respective message is to be processed by the HV; and
  the indication of the remaining delay budget for the respective message is received with the respective message.

2. The method of claim 1, wherein determining the first subset of the plurality of RVs comprises:
 defining a plurality of subsets of the plurality of RVs, wherein each subset of the plurality of subsets comprises a different number of RVs from the plurality of RVs; and
 selecting the first subset from the plurality of subsets based on the one or more operating constraints.

3. The method of claim 2, wherein defining each subset of the plurality of subsets is based at least in part on the one or more road conditions.

4. The method of claim 1, wherein determining the priority for the respective message comprises:
 obtaining, at a radio layer of the HV, the indication of the remaining delay budget for the respective message; and
 providing, from the radio layer to an application layer of the HV, the indication of the remaining delay.

5. The method of claim 4, wherein providing the indication of the remaining delay comprises providing a modified indication of the remaining delay to account for (i) delay of the radio layer and (ii) Over The Air (OTA) delay.

6. The method of claim 4, wherein the radio layer of the HV obtains the indication of the remaining delay budget for the respective message via a Physical Sidelink Control Channel (PSCCH) for the respective message.

7. The method of claim 1, wherein the messages comprise Vehicle To Everything (V2X) Basic Safety Messages (BSMs).

8. The method of claim 1, wherein the one or more road conditions of a road on which the HV is located comprise:
 a number of lanes of the road,
 a current lane of the HV,
 a speed limit of the road,
 a road hazard,
 a weather condition,
 a curvature of the road,
 speed of the HV,
 heading of the HV, or
 a trajectory of one or more RVs of the plurality of RVs, or any combination thereof.

9. The method of claim 1, wherein the one or more operating constraints of the HV comprise:
 a message processing capability,
 a thermal constraint,
 a concurrency constraint,
 or any combination thereof.

10. The method of claim 1, wherein determining the priority for the respective message is performed by a radio layer of the HV, an application layer of the HV, or both.

11. The method of claim 1, further comprising filtering out the messages from RVs of the plurality of RVs that are not in the first subset, wherein the filtering is performed by a radio layer of the HV, an application layer of the HV, or both.

12. A device for message selection and prioritization at a host vehicle (HV), the device comprising:
 one or more wireless transceivers;
 a memory; and
 one or more processors communicatively coupled to the one or more wireless transceivers and the memory and configured to:
  receive, via the one or more wireless transceivers, messages from a plurality of remote vehicles (RVs);
  determine a first subset of the plurality of RVs from which to process the messages, wherein the first subset is determined based at least in part on:
   the respective location of each RV relative to the HV,
   one or more road conditions, and
   one or more operating constraints of the HV; and
  for each message received from an RV in the first subset, determine a priority for the respective message based at least in part on an indication of a remaining delay budget for the respective message, wherein:
   the priority for the respective message determines an order in which content of the respective message is to be processed by the HV; and
   the indication of the remaining delay budget for the respective message is received with the respective message.

13. The device of claim 12, wherein, to determine the first subset of the plurality of RVs, the one or more processors are configured to:
 define a plurality of subsets of the plurality of RVs, wherein each subset of the plurality of subsets comprises a different number of RVs from the plurality of RVs; and
 select the first subset from the plurality of subsets based on the one or more operating constraints.

14. The device of claim 13, wherein the one or more processors are configured to define each subset of the plurality of subsets based at least in part on the one or more road conditions.

15. The device of claim 12, further comprising a radio layer and an application later, wherein to determine the priority for the respective message:
 the radio layer is configured to obtain the indication of the remaining delay budget for the respective message; and
 the radio layer is configured to provide, to the application layer, the indication of the remaining delay.

16. The device of claim 15, wherein, to provide the indication of the remaining delay, the radio layer is configured to provide a modified indication of the remaining delay to account for (i) delay of the radio layer and (ii) Over The Air (OTA) delay.

17. The device of claim 15, wherein the radio layer is configured to obtain the indication of the remaining delay budget for the respective message via a Physical Sidelink Control Channel (PSCCH) for the respective message.

18. The device of claim 15, wherein the radio layer is implemented by the one or more transceivers, and the application layer is implemented by the one or more processors.

19. The device of claim 15, wherein the radio layer, the application layer, or both, are configured to determine the priority for the respective message.

20. The device of claim 15, wherein the radio layer, the application layer, or both, are configured to filter out the messages from RVs of the plurality of RVs that are not in the first subset.

21. A device comprising:
means for wirelessly receiving messages from a plurality of remote vehicles (RVs);
means for determining a first subset of the plurality of RVs from which to process the messages, wherein the first subset is determined based at least in part on:
the respective location of each RV relative to a host vehicle (HV),
one or more road conditions, and
one or more operating constraints of the HV; and
means for determining, for each message received from an RV in the first subset, a priority for the respective message based at least in part on an indication of a remaining delay budget for the respective message, wherein:
the priority for the respective message determines an order in which content of the respective message is to be processed by the HV; and
the indication of the remaining delay budget for the respective message is received with the respective message.

22. The device of claim 21, wherein the means for determining the first subset of the plurality of RVs comprises:
means for defining a plurality of subsets of the plurality of RVs, wherein each subset of the plurality of subsets comprises a different number of RVs from the plurality of RVs; and
means for selecting the first subset from the plurality of subsets based on the one or more operating constraints.

23. The device of claim 21, wherein the means for determining the priority for the respective message comprises:
means for obtaining, at a radio layer of the HV, the indication of the remaining delay budget for the respective message; and
means for providing, from the radio layer to an application layer of the HV, the indication of the remaining delay.

24. The device of claim 23, wherein the means for providing the indication of the remaining delay comprises means for providing a modified indication of the remaining delay to account for (i) delay of the radio layer and (ii) Over The Air (OTA) delay.

25. The device of claim 21, wherein the means for determining the priority for the respective message comprise means for implementing a radio layer of the HV, an application layer of the HV, or both.

26. The device of claim 21, further comprising means for filtering out the messages from RVs of the plurality of RVs that are not in the first subset, wherein means for filtering comprise means for implementing a radio layer of the HV, an application layer of the HV, or both.

27. A non-transitory computer-readable medium having instructions stored thereon for message selection and prioritization at a host vehicle (HV), wherein the instructions, when executed by one or more processors, cause the one or more processors to:
wirelessly receive messages from a plurality of remote vehicles (RVs);
determine a first subset of the plurality of RVs from which to process the messages, wherein the first subset is determined based at least in part on:
the respective location of each RV relative to the HV, one or more road conditions, and
one or more operating constraints of the HV; and
determine, for each message received from an RV in the first subset, a priority for the respective message based at least in part on an indication of a remaining delay budget for the respective message, wherein:
the priority for the respective message determines an order in which content of the respective message is to be processed by the HV; and
the indication of the remaining delay budget for the respective message is received with the respective message.

28. The non-transitory computer-readable medium of claim 27, wherein the instructions for causing the one or more processors to determine the first subset of the plurality of RVs further comprise instructions for causing the one or more processors to:
define a plurality of subsets of the plurality of RVs, wherein each subset of the plurality of subsets comprises a different number of RVs from the plurality of RVs; and
means for selecting the first subset from the plurality of subsets based on the one or more operating constraints.

29. The non-transitory computer-readable medium of claim 27, wherein the instructions for causing the one or more processors to determine the priority for the respective message further comprise instructions for causing the one or more processors to:
obtain, at a radio layer of the HV, the indication of the remaining delay budget for the respective message; and
provide, from the radio layer to an application layer of the HV, the indication of the remaining delay.

30. The non-transitory computer-readable medium of claim 27, wherein the instructions, when executed by the one or more processors, further cause the one or more processors to filter out the messages from RVs of the plurality of RVs that are not in the first subset at a radio layer of the HV, an application layer of the HV, or both.

* * * * *